US012568148B2

(12) United States Patent
Pang et al.

(10) Patent No.: US 12,568,148 B2
(45) Date of Patent: Mar. 3, 2026

(54) METHOD, DEVICE, AND SYSTEM

(71) Applicant: HUAWEI TECHNOLOGIES CO., LTD., Shenzhen (CN)

(72) Inventors: Lingli Pang, Shanghai (CN); Zhixi Wang, Munich (DE); Xiaona Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 17/536,567

(22) Filed: Nov. 29, 2021

(65) Prior Publication Data

US 2022/0086243 A1 Mar. 17, 2022

Related U.S. Application Data

(63) Continuation of application No. PCT/CN2020/075866, filed on Feb. 19, 2020.

(30) Foreign Application Priority Data

May 30, 2019 (CN) .......................... 201910465711.9

(51) Int. Cl.
*H04L 67/141* (2022.01)
*H04L 67/51* (2022.01)
(52) U.S. Cl.
CPC ............. *H04L 67/51* (2022.05); *H04L 67/141* (2013.01)
(58) Field of Classification Search
CPC ........ H04L 67/51; H04L 67/52; H04L 67/141
(Continued)

(56) References Cited

U.S. PATENT DOCUMENTS 7,555,546 B1 * 6/2009 Anumala ................ H04L 69/24
714/39
9,591,582 B1 * 3/2017 Rabii .................... H04L 43/028
(Continued)

FOREIGN PATENT DOCUMENTS

CA 2883809 A1 * 3/2014 ........... H04L 43/022
CN 1984020 A 6/2007
(Continued)

OTHER PUBLICATIONS

Schriegel Sebastian et al: "Investigation on a distributed SON control plane architecture for heterogeneous time sensitive networks", 2018 14TH IEEE International Workshop on Factory Communication Systems (WFCS), IEEE, Jun. 13, 2018, pp. 1-10, XP033369576.

(Continued)

*Primary Examiner* — Khanh Q Dinh
(74) *Attorney, Agent, or Firm* — HAUPTMAN HAM, LLP

(57) ABSTRACT

A method includes receiving, by a first device in a transport network, a first service requirement parameter and a second service requirement parameter. The first service requirement parameter is a service requirement parameter of a transmit end device. The second service requirement parameter is a service requirement parameter of a receive end device. The method further includes determining, by the first device, a first service transmission requirement between the transmit end device and the receive end device based on the first service requirement parameter and the second service requirement parameter.

19 Claims, 13 Drawing Sheets

(58) Field of Classification Search

USPC ................................ 709/203, 220, 224–228

See application file for complete search history.

(56) References Cited

U.S. PATENT DOCUMENTS

| | | | | |
|---|---|---|---|---|
| 10,728,344 | B2 * | 7/2020 | Fang ...................... | H04L 67/51 |
| 11,064,421 | B2 * | 7/2021 | Zhang ................... | H04W 48/06 |
| 11,792,723 | B2 * | 10/2023 | Bogineni .......... | H04W 36/0022 |
| | | | | 370/331 |
| 11,882,035 | B2 * | 1/2024 | Li ........................... | H04L 69/22 |
| 2012/0321052 | A1 * | 12/2012 | Morrill .............. | H04L 12/5692 |
| | | | | 379/32.01 |
| 2017/0180277 | A1 | 6/2017 | Brady et al. | |
| 2017/0195820 | A1 | 7/2017 | Rune et al. | |
| 2017/0237818 | A1 * | 8/2017 | Fang ...................... | H04W 4/00 |
| | | | | 709/227 |
| 2018/0234896 | A1 * | 8/2018 | Liu ................... | H04W 36/0072 |
| 2018/0234902 | A1 * | 8/2018 | Talbert ................. | H04M 15/88 |
| 2018/0359747 | A1 * | 12/2018 | Yang ..................... | H04W 72/04 |
| 2019/0069199 | A1 * | 2/2019 | Yan ................... | H04W 28/0268 |
| 2019/0230644 | A1 * | 7/2019 | Cheng .............. | H04W 72/0446 |
| 2020/0015293 | A1 * | 1/2020 | Wang ................... | H04W 24/02 |
| 2021/0243243 | A1 * | 8/2021 | Ljung ................... | H04L 65/764 |
| 2022/0167246 | A1 * | 5/2022 | Lim ..................... | H04L 51/212 |
| 2023/0086487 | A1 * | 3/2023 | Wang ..................... | H04L 45/02 |
| | | | | 370/392 |
| 2023/0119045 | A1 * | 4/2023 | Abdelmalek ........ | H04W 48/18 |
| | | | | 370/328 |

FOREIGN PATENT DOCUMENTS

| | | | | | | |
|---|---|---|---|---|---|---|
| CN | 101060717 | A | | 10/2007 | | |
| CN | 102711192 | A | | 10/2012 | | |
| CN | 103118401 | A | | 5/2013 | | |
| CN | 103152228 | A | | 6/2013 | | |
| CN | 103312441 | A | | 9/2013 | | |
| CN | 104144447 | A | * | 11/2014 | ........ | H04W 52/0216 |
| CN | 105812173 | A | | 7/2016 | | |
| CN | 106330756 | A | | 1/2017 | | |
| CN | 106817351 | A | | 6/2017 | | |
| CN | 108934034 | A | | 12/2018 | | |
| CN | 109257208 | A | | 1/2019 | | |
| CN | 115242645 | A | * | 10/2022 | ......... | H04L 63/0428 |
| EP | 3771165 | A1 | * | 1/2021 | .......... | H04L 47/215 |
| KR | 20110054370 | A | | 5/2011 | | |
| WO | 2018068211 | A1 | | 4/2018 | | |
| WO | WO-2021134380 | A1 | * | 7/2021 | ............ | H04W 12/08 |

OTHER PUBLICATIONS

Ehrlich Marco et al: "Automatic mapping of cyber security requirements to support network slicing in software-defined networks", 2017 22nd IEEE International Conference on Emerging Technologies and Factory Automation (ETFA), IEEE, Sep. 12, 2017, pp. 1-4, XP033293062.

R. Enns et al., Network Configuration Protocol (NETCONF). RFC6241, Jun. 2011, 113 pages.

European Search Report issued in corresponding European Application No. 20814887.4, dated May 3, 2022, pp. 1-12.

International Search Report issued in corresponding International Application No. PCT/CN2020/075866, dated May 22, 2020, pp. 1-10.

Chinese Office Action issued in corresponding Chinese Application No. 201910465711.9, dated Apr. 28, 2021, pp. 1-6.

* cited by examiner

50

METHOD, DEVICE, AND SYSTEM

CROSS-REFERENCE TO RELATED APPLICATIONS

This application is a continuation of International Patent Application No. PCT/CN2020/075866, filed on Feb. 19, 2020, which claims priority to Chinese Patent Application No. 201910465711.9, filed on May 30, 2019, the disclosures of the aforementioned applications are hereby incorporated by reference in their entireties.

TECHNICAL FIELD

This application relates to the field of communication technologies, and in particular, to a method for determining a service transmission requirement, a device, and a system.

BACKGROUND

An open platform communications unified architecture (OPC UA) is a platform-independent communication manner, and defines an industrial information model to implement semantic interworking between industrial devices. Based on the OPC UA, industrial devices communicate with each other through a transport network to support interconnection and interoperation between different industrial devices. As a type of transport network, a fifth generation (5G) network is an open and standardized transport network, and forms, together with the OPC UA, a top-down communication protocol for industrial devices. This is applicable to communication between different industrial devices in the industry from a control layer to a field layer.

With popularization and promotion of the OPC UA, the OPC UA supports communication in more and more scenarios in factories. Service transmission requirements in different scenarios vary greatly based on requirements of the factories. In this case, the transport network needs to be able to identify service transmission requirements of different industrial devices. Therefore, a corresponding transmission path that can guarantee transmission performance is established. However, when the transport network and the OPC UA converge, there is no related solution for the transport network to obtain a service transmission requirement of an industrial device.

SUMMARY

One or more embodiments of this application provide a method for determining a service transmission requirement, a device, and a system, to enable a transport network to obtain a service transmission requirement of an industrial device when the transport network and an OPC UA converge.

To achieve the one or more foregoing objectives, one or more of the following technical solutions are used in one or more embodiments of this application.

According to a first aspect, a method for determining a service transmission requirement is provided, and is applied to a first device in a transport network. The method includes: The first device receives a first service requirement parameter and a second service requirement parameter, where the first service requirement parameter is a service requirement parameter of a transmit end device, and the second service requirement parameter is a service requirement parameter of a receive end device. The first device determines a first service transmission requirement between the transmit end device and the receive end device based on the first service requirement parameter and the second service requirement parameter. Based on the method for determining a service transmission requirement, the transport network may obtain a service transmission requirement of an industrial device, and the service transmission requirement can meet a data obtaining or exchange requirement of an application layer of the industrial device, for example, transmission reliability, transmission determinacy, or transmission timeliness (for example, a service data receive delay). Then, the transport network may initiate, based on the service transmission requirement, establishment of a transmission path corresponding to the service transmission requirement in the transport network.

In some embodiments, the first service requirement parameter includes one or more of the following parameters: a size of a data packet sent by the transmit end device; a time interval at which the transmit end device sends the data packet; a processing delay of a data packet to be sent by the transmit end device; and a quantity of lost data packets, a quantity of errors, or a data packet loss rate or error rate within a specified time period allowed by the transmit end device.

In some embodiments, the second service requirement parameter includes a transmission delay of the data packet sent by the transmit end device.

In some embodiments, the second service requirement parameter further includes a delay of processing, in the receive end device, the data packet received from the transmit end device.

In some embodiments, that the first device receives a first service requirement parameter and a second service requirement parameter includes: The first device receives a first message, where the first message includes the first service requirement parameter. The first device receives a second message, where the second message includes the second service requirement parameter. That is, in this embodiment of this application, the first device can respectively receive the first service requirement parameter and the second service requirement parameter from the transmit end device and the receive end device.

In some embodiments, the first message further includes one or more of an identifier of the receive end device, a network storage requirement, or indication information, where the network storage requirement is used to indicate whether the transport network supports storage of the data packet sent by the transmit end device; and the indication information is used to indicate whether the data packet sent by the transmit end device is received by a plurality of receive end devices.

In some embodiments, the second message further includes an identifier of the transmit end device.

In some embodiments, the method further includes: The first device initiates establishment of a transmission path corresponding to the first service transmission requirement in the transport network, where the transmission path is a transmission path between the transmit end device and the receive end device. The first device sends a third message, where the third message is used to indicate that the establishment of the transmission path is completed. Based on this solution, because the first device initiates the establishment of the transmission path corresponding to the first service transmission requirement in the transport network, the data packet can be transmitted between the transmit end device and the receive end device.

In some embodiments, the third message includes an identifier of the transmission path and/or a moment at which the transmit end device sends the data packet.

In some embodiments, that the first device initiates establishment of a transmission path corresponding to the first service transmission requirement in the transport network includes: The first device controls the establishment of the transmission path corresponding to the first service transmission requirement in the transport network. That is, in this embodiment of this application, the first device can control the establishment of the transmission path corresponding to the first service transmission requirement in the transport network.

In some embodiments, that the first device initiates establishment of a transmission path corresponding to the first service transmission requirement in the transport network includes: The first device sends the first service transmission requirement to a control network element in the transport network. The control network element controls the establishment of the transmission path corresponding to the first service transmission requirement. Before the first device sends the third message, the method further includes: The first device receives a fourth message from the control network element, where the fourth message is used to indicate that the establishment of the transmission path is completed. That is, in this embodiment of this application, the establishment of the transmission path corresponding to the first service transmission requirement may be controlled by the control network element in the transport network.

In some embodiments, the fourth message includes an identifier of the transmission path and/or a moment at which the transmit end device sends the data packet.

In some embodiments, the method further includes: When the transport network does not meet the first service transmission requirement, the first device obtains a second service transmission requirement, where the second service transmission requirement is an updated service transmission requirement corresponding to the first service transmission requirement. The first device initiates establishment of a transmission path corresponding to the second service transmission requirement in the transport network, where the transmission path is a transmission path between the transmit end device and the receive end device. The first device sends a fifth message, where the fifth message is used to indicate that the establishment of the transmission path is completed. In other words, considering that when an industrial network performs data packet transmission by using a cellular network, due to limited cellular network resources, there may be a scenario in which a service requirement of the industrial network cannot be met. Therefore, in this embodiment of this application, when the transport network does not meet the first service transmission requirement, the first device obtains a second service transmission requirement, where the second service transmission requirement is an updated service transmission requirement corresponding to the first service transmission requirement. Then, the first device initiates establishment of a transmission path corresponding to the second service transmission requirement in the transport network. In this way, the data packet can be transmitted between the transmit end device and the receive end device.

In some embodiments, the fifth message includes an identifier of the transmission path and/or a moment at which the transmit end device sends the data packet.

In some embodiments, that the first device obtains a second service transmission requirement includes: The first device sends a sixth message, where the sixth message carries an updated service requirement parameter of the transmit end device. The first device receives a seventh message, where the seventh message is used to acknowledge that a change of the service requirement parameter of the transmit end device is allowed. The first device determines the second service transmission requirement based on the second service requirement parameter and the updated service requirement parameter of the transmit end device. That is, in this embodiment of this application, the service transmission requirement between the transmit end device and the receive end device can be updated by updating only the service requirement parameter of the transmit end device.

In some embodiments, that the first device obtains a second service transmission requirement includes: The first device sends an eighth message, where the eighth message carries an updated service requirement parameter of the receive end device. The first device receives a ninth message, where the ninth message is used to acknowledge that a change of the service requirement parameter of the receive end device is allowed. The first device determines the second service transmission requirement based on the first service requirement parameter and the updated service requirement parameter of the receive end device. That is, in this embodiment of this application, the service transmission requirement between the transmit end device and the receive end device can be updated by updating only the service requirement parameter of the receive end device.

In some embodiments, that the first device obtains a second service transmission requirement includes: The first device sends a sixth message, where the sixth message carries an updated service requirement parameter of the transmit end device. The first device receives a seventh message, where the seventh message is used to acknowledge that a change of the service requirement parameter of the transmit end device is allowed. The first device sends an eighth message, where the eighth message carries an updated service requirement parameter of the receive end device. The first device receives a ninth message, where the ninth message is used to acknowledge that a change of a service requirement parameter of the receive end device is allowed. The first device determines the second service transmission requirement based on the updated service requirement parameter of the transmit end device and the updated service requirement parameter of the receive end device. That is, in this embodiment of this application, the service transmission requirement between the transmit end device and the receive end device can be updated by simultaneously updating the service requirement parameter of the transmit end device and the service requirement parameter of the receive end device.

According to a second aspect, a communication apparatus is provided, to implement the foregoing methods. The communication apparatus may be the first device in the first aspect, or an apparatus including the first device. The communication apparatus includes a corresponding module, unit, or means (means) for implementing the foregoing method. The module, unit, or means may be implemented by using hardware or software, or implemented by using hardware by executing corresponding software. The hardware or the software includes one or more modules or units corresponding to the functions.

According to a third aspect, a communication apparatus is provided, including a processor and a memory. The memory is configured to store computer instructions, and when the processor executes the instructions, the communication apparatus is enabled to perform the method according to any one of the foregoing aspects. The communication apparatus may be the first device in the first aspect, or an apparatus including the first device.

According to a fourth aspect, a communication apparatus is provided, including a processor. The processor is configured to: after being coupled to a memory and reading instructions in the memory, perform, based on the instructions, the method according to any one of the foregoing aspects. The communication apparatus may be the first device in the first aspect, or an apparatus including the first device.

According to a fifth aspect, a computer-readable storage medium is provided. The computer-readable storage medium stores instructions, and when the instructions are run on a computer, the computer is enabled to perform the method according to any one of the foregoing aspects.

According to a sixth aspect, a computer program product including instructions is provided. When the computer program product runs on a computer, the computer is enabled to perform the method according to any one of the foregoing aspects.

According to a seventh aspect, a communication apparatus (for example, the communication apparatus may be a chip or a chip system) is provided. The communication apparatus includes a processor, configured to implement the function in any one of the foregoing aspects. In some embodiments, the communication apparatus further includes a memory. The memory is configured to store necessary program instructions and data. When the communication apparatus is the chip system, the communication apparatus may include a chip, or may include a chip and another discrete component.

For technical effects brought by any design manner of the second aspect to the seventh aspect, refer to technical effects brought by different design manners of the first aspect. Details are not described herein again for brevity.

According to an eighth aspect, a communication method is provided. The method includes: A transmit end device sends a first service requirement parameter, where the first service requirement parameter is a service requirement parameter of the transmit end device. The receive end device sends a second service requirement parameter, where the second service requirement parameter is a service requirement parameter of the receive end device. A first device used in a transport network receives the first service requirement parameter and the second service requirement parameter, and determines a first service transmission requirement between the transmit end device and the receive end device based on the first service requirement parameter and the second service requirement parameter. For a technical effect of the eighth aspect, refer to the technical effect brought by the first aspect. Details are not described herein again for brevity.

According to a ninth aspect, a communication system is provided. The communication system includes a transmit end device, a receive end device, and a first device used in a transport network. The transmit end device is configured to send a first service requirement parameter, where the first service requirement parameter is a service requirement parameter of the transmit end device. The receive end device is configured to send a second service requirement parameter, where the second service requirement parameter is a service requirement parameter of the receive end device. The first device is configured to: receive the first service requirement parameter and the second service requirement parameter, and determine a first service transmission requirement between the transmit end device and the receive end device based on the first service requirement parameter and the second service requirement parameter. For a technical effect of the ninth aspect, refer to the technical effect brought by the first aspect. Details are not described herein again for brevity.

DESCRIPTION OF EMBODIMENTS

For ease of understanding solutions in embodiments of this application, related concepts are first briefly described as follows:

First, QoS parameter:

The QoS parameter in the embodiments of this application includes one or more of the following parameters:

1. 5G QoS Identifier (5QI)

The 5QI is a scalar used to index to a corresponding 5G QoS characteristic. The 5QI is classified into a standardized 5QI, a preconfigured 5QI, and a dynamically allocated 5QI. The standardized SQIs are in a one-to-one correspondence with a group of standardized 5G QoS characteristic values. A 5G QoS characteristic value corresponding to the preconfigured 5QI is preconfigured on an access network device. A 5G QoS characteristic corresponding to the dynamically allocated 5QI is sent by a core network device to the access network device by using a QoS profile (QoS profile).

2. Allocation and Retention Priority (ARP)

The ARP includes a priority level, a pre-emption capability, and a pre-emption vulnerability.

3. Guaranteed Flow Bit Rate (GFBR)

The GFBR represents a bit rate that is expected to be provided to a guaranteed bit rate (GBR) QoS flow (flow).

4. Maximum Flow Bit Rate (MFBR)

The MFBR is used to limit a bit rate provided to a GBR QoS flow, namely, a maximum bit rate provided to the GBR QoS flow. If the bit rate is exceeded, a data packet can be discarded.

5. Reflective QoS Attribute (RQA)

The RQA is used to indicate a service transmitted by using a corresponding QoS flow, to use reflective QoS.

6. QoS Notification Control (QNC)

The QNC is used to indicate whether an access network device notifies a network in a use period of a QoS flow when a GFBR cannot be met.

Figure 1:
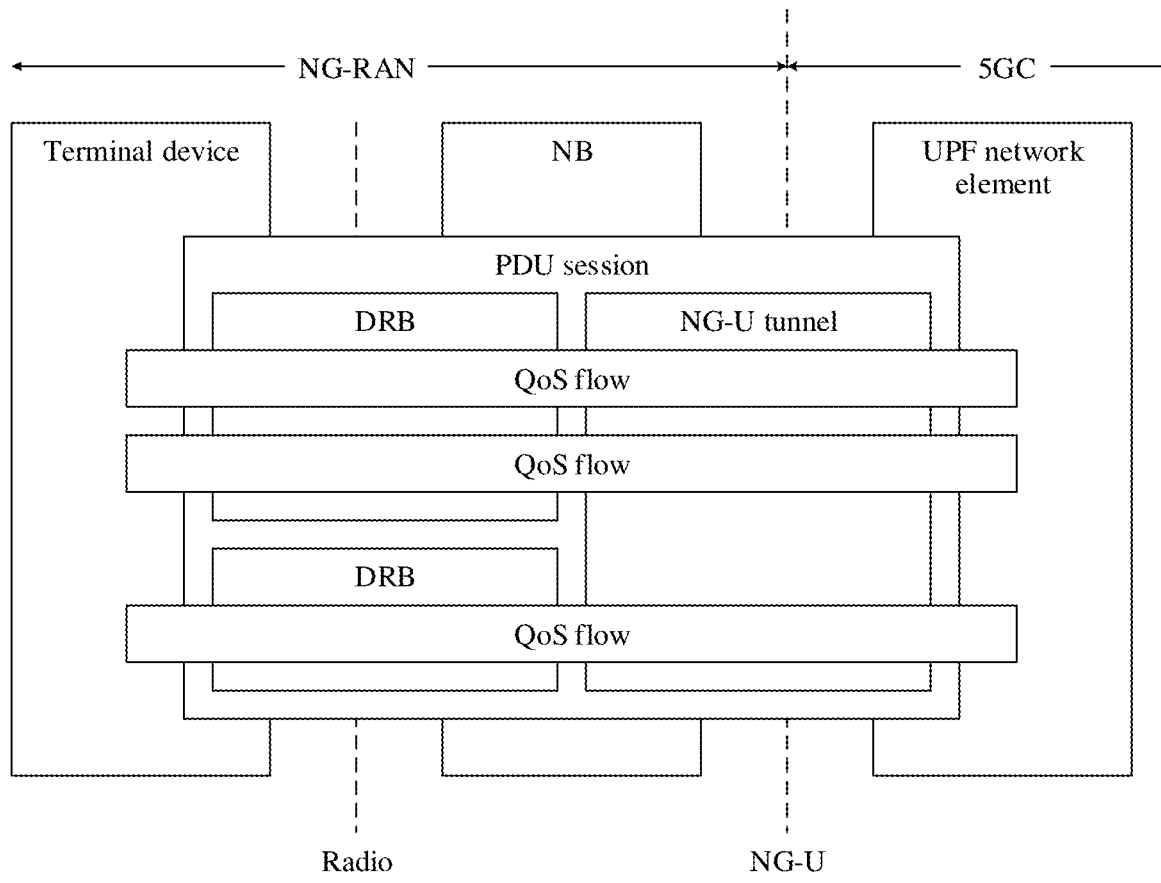
FIG. 1 shows an existing 5G quality of service (QoS) model.

Second, QoS model:

In a 5G network system, to ensure end-to-end service quality of a service, a QoS flow-based 5G QoS model is proposed, as shown in FIG. 1. The 5G QoS model supports a guaranteed bit rate QoS flow (namely, a GBR QoS flow) and a non-guaranteed bit rate QoS flow (namely, a non-GBR (non-GBR) QoS flow). Same transmission processing (such as scheduling or an admission threshold) is performed on data packets controlled by a same QoS flow.

As shown in FIG. 1, a terminal device may establish one or more protocol data unit (PDU) sessions with a 5G network. One or more QoS flows can be established in each PDU session. Each QoS flow is identified by a QoS flow identifier (QFI). A QFI uniquely identifies a QoS flow in a session. In addition, each QoS flow corresponds to one data radio bearer (DRB), and one DRB may correspond to one or more QoS flows.

Whether a QoS flow is a GBR QoS flow or a non-GBR QoS flow is determined by a corresponding QoS profile.

For a GBR QoS flow, a corresponding QoS profile includes the following QoS parameters: a 5QI, an ARP, a GFBR, and an MFBR, and optionally includes QNC. Based on whether the QoS profile includes QNC, a GBR QoS flow is classified into a GRB QoS flow that requires notification control and a GBR QoS flow that does not require notification control. For a GBR QoS flow that requires notification control, when an access network device detects that a corresponding QoS flow resource cannot be satisfied, the access network device notifies a session management function (SMF) network element of the event. Further, the SMF network element may initiate a QoS flow deletion or modification procedure.

For a non-GBR QoS flow, a corresponding QoS profile includes the following QoS parameters: a 5QI and an ARP, and optionally includes RQA.

Figure 2:
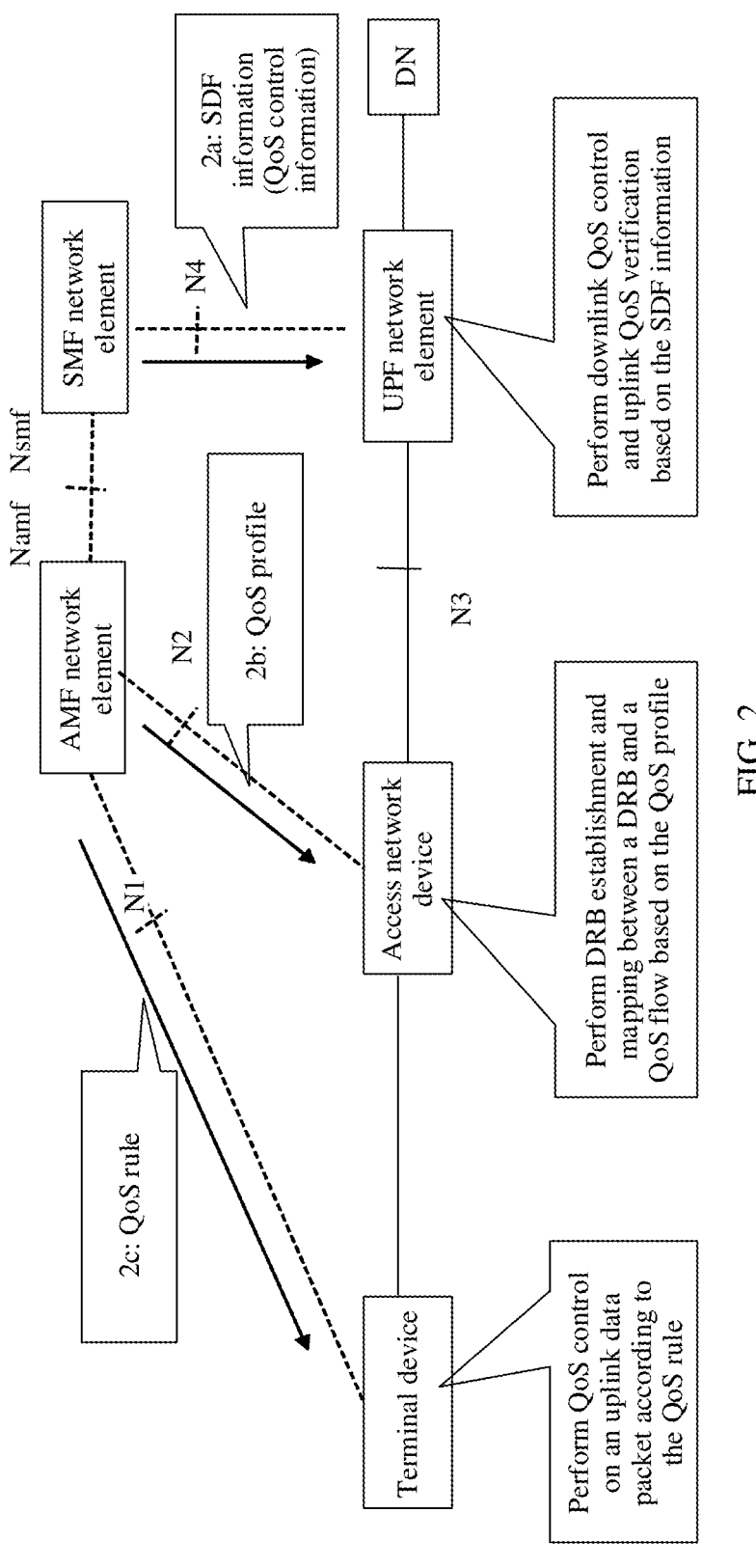
FIG. 2 is a schematic diagram of an existing architecture of establishing a signaling-based QoS flow.

In addition, the GBR QoS flow is mainly controlled in a signaling-based manner. A corresponding QoS flow establishment procedure is shown in FIG. 2, and includes the following steps.

Step 1: The SMF network element determines, according to a local policy or a PCC rule sent by a PCF network element, to establish a QoS flow. (2a) The SMF network element sends SDF information to a user plane function (UPF) network element, where the SDF information includes QoS control information. (2b) The SMF network element sends a QoS profile of the QoS flow to the access network device through an access and mobility management function (AMF) network element. (2c) The SMF network element sends a QoS rule (QoS rule) to the terminal device through the AMF network element and the access network device, where the QoS rule includes QoS control information.

Step 2: A QoS flow is established between the terminal device, the access network device, and the UPF network element. The access network device establishes an air interface DRB based on the QoS profile, and stores a binding relationship between the QoS flow and the DRB.

For a downlink, when receiving a downlink data packet, the UPF network element includes a QFI in a data packet header of the downlink data packet based on the SDF information sent by the SMF network element. When receiving the downlink data packet, the access network device transmits the downlink data packet on a corresponding DRB based on the QFI in the data packet header and the corresponding binding relationship between a QoS flow and a DRB.

For an uplink, when determining to send an uplink data packet, the terminal device determines a QoS flow according to a QoS rule, carries a QFI in a data packet header of a to-be-sent uplink data packet, and transmits the uplink data packet on a corresponding DRB based on the binding relationship between a QoS flow and a DRB. When receiving the uplink data packet, the access network device includes a QFI in a data packet header of an uplink data packet between the access network device and the UPF network element based on the QFI in the data packet header. When receiving the uplink data packet sent by the access network device, the UPF network element verifies whether the data packet is transmitted through a correct QoS flow.

Figure 3:
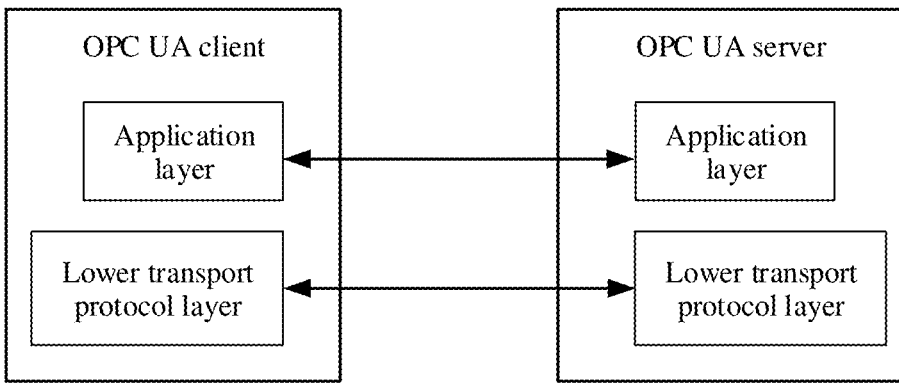
FIG. 3 is a first schematic diagram of an OPC UA according to at least an embodiment of this application.

Third, OPC UA:

FIG. 3 shows an OPC UA according to at least an embodiment of this application. The OPC UA is one-to-one communication, and includes an OPC UA client (client) and an OPC UA server (server). Both the OPC UA client and the OPC UA server include an application layer (application layer) and a lower transport protocol layer. The lower transport protocol layer may be a physical layer or a media access control (MAC) layer. This is not specifically limited in this embodiment of this application.

Figure 4:
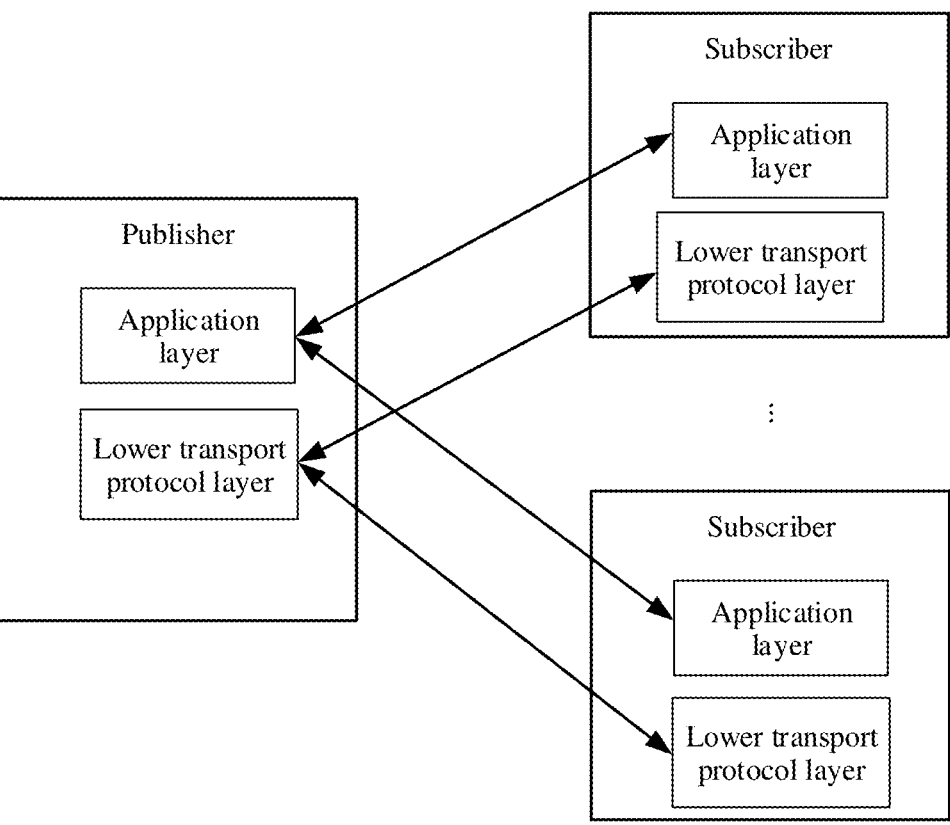
FIG. 4 is a second schematic diagram of an OPC UA according to at least an embodiment of this application.

FIG. 4 shows another OPC UA according to at least an embodiment of this application. The OPC UA is one-to-many communication, and includes one publisher (publisher) and a plurality of subscribers (subscribers). Both the publisher and the subscriber include an application layer (application layer) and a lower transport protocol layer. The lower transport protocol layer may be a physical layer or a MAC layer. This is not specifically limited in this embodiment of this application.

It should be noted that, the OPC UA client and the OPC UA server shown in FIG. 3, or the publisher and the subscriber shown in FIG. 4 may further include a protocol layer other than the application layer and the lower transport protocol layer. This embodiment of this application provides only an example of a protocol layer required in a subsequent embodiment, and another protocol layer is not specifically limited.

The following describes the technical solutions in the embodiments of this application with reference to the accompanying drawings in the embodiments of this application. In the descriptions of this application, "I" represents an "or" relationship between associated objects unless otherwise specified. For example, A/B may represent A or B. The term "and/or" in this application is merely an association relationship for describing the associated objects, and represents that three relationships may exist. For example, A and/or B may represent the following three cases: Only A exists, both A and B exist, and only B exists, where A and B each may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one (piece) of a, b, or c may indicate: a, b, c, a and b, a and c, b and c, or a, b, and c, where a, b, and c each may be singular or plural. In addition, to clearly describe the technical solutions in the embodiments of this application, terms such as "first" and "second" are used in the embodiments of this application to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference. In addition, in the embodiments of this application, a word such as "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word such as "example" or "for example" is intended to present a relative concept in a specific manner for ease of understanding.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 5:
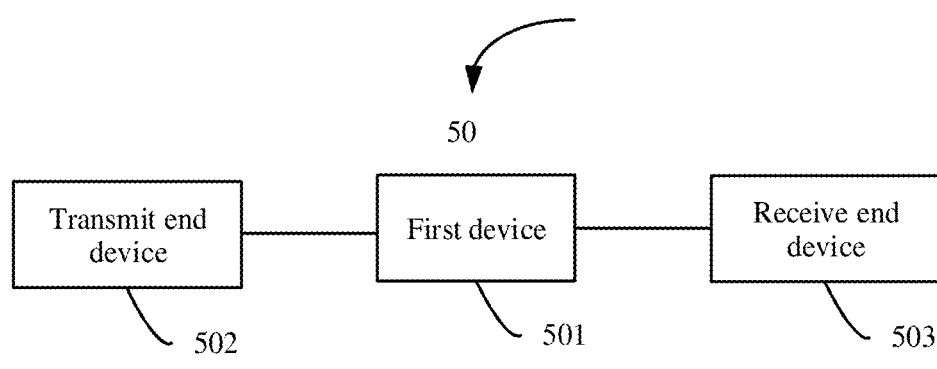
FIG. 5 is a schematic diagram of an architecture of a communication system according to at least an embodiment of this application.

FIG. 5 shows a communication system 50 according to at least an embodiment of this application. The communication system 50 includes a transmit end device 502, a receive end device 503, and a first device 501 in a transport network. The first device 501 may directly communicate with the transmit end device 502 or the receive end device 503, or may communicate with the transmit end device 502 or the receive end device 503 through forwarding by another device. This is not specifically limited in this embodiment of this application.

The transmit end device 502 is configured to send a first service requirement parameter, where the first service requirement parameter is a service requirement parameter of the transmit end device. The receive end device 503 is configured to send a second service requirement parameter, where the second service requirement parameter is a service requirement parameter of the receive end device. The first device 501 is configured to: receive the first service requirement parameter and the second service requirement parameter, and determine a first service transmission requirement between the transmit end device 502 and the receive end device 503 based on the first service requirement parameter and the second service requirement parameter. Specific implementation of the solutions is described in detail in subsequent method embodiments. Details are not described herein for brevity.

In some embodiments, the transmit end device 502 in this embodiment of this application may be an OPC UA server in the OPC UA architecture shown in FIG. 3, and the receive end device 503 in this embodiment of this application may be an OPC UA client in the OPC UA architecture shown in FIG. 3. In some embodiments, the transmit end device 502 may be a publisher in the OPC UA architecture shown in FIG. 4, and the receive end device 503 in this embodiment of this application may be a subscriber in the OPC UA architecture shown in FIG. 4. This is not specifically limited in this embodiment of this application.

Based on the communication system, the transport network may obtain a service transmission requirement of an industrial device, and the service transmission requirement can meet a data obtaining or exchange requirement of an application layer of the industrial device, for example, transmission reliability, transmission determinacy, or transmission timeliness (for example, a service data receive delay). Then, the transport network may initiate, based on the service transmission requirement, establishment of a transmission path corresponding to the service transmission requirement in the transport network.

In some embodiments, the transport network in this embodiment of this application may be a wireless cellular network. For example, the wireless cellular network may be a fourth generation (4G) network, a 5G network, or another future network. This is not specifically limited in this embodiment of this application.

Figure 6:
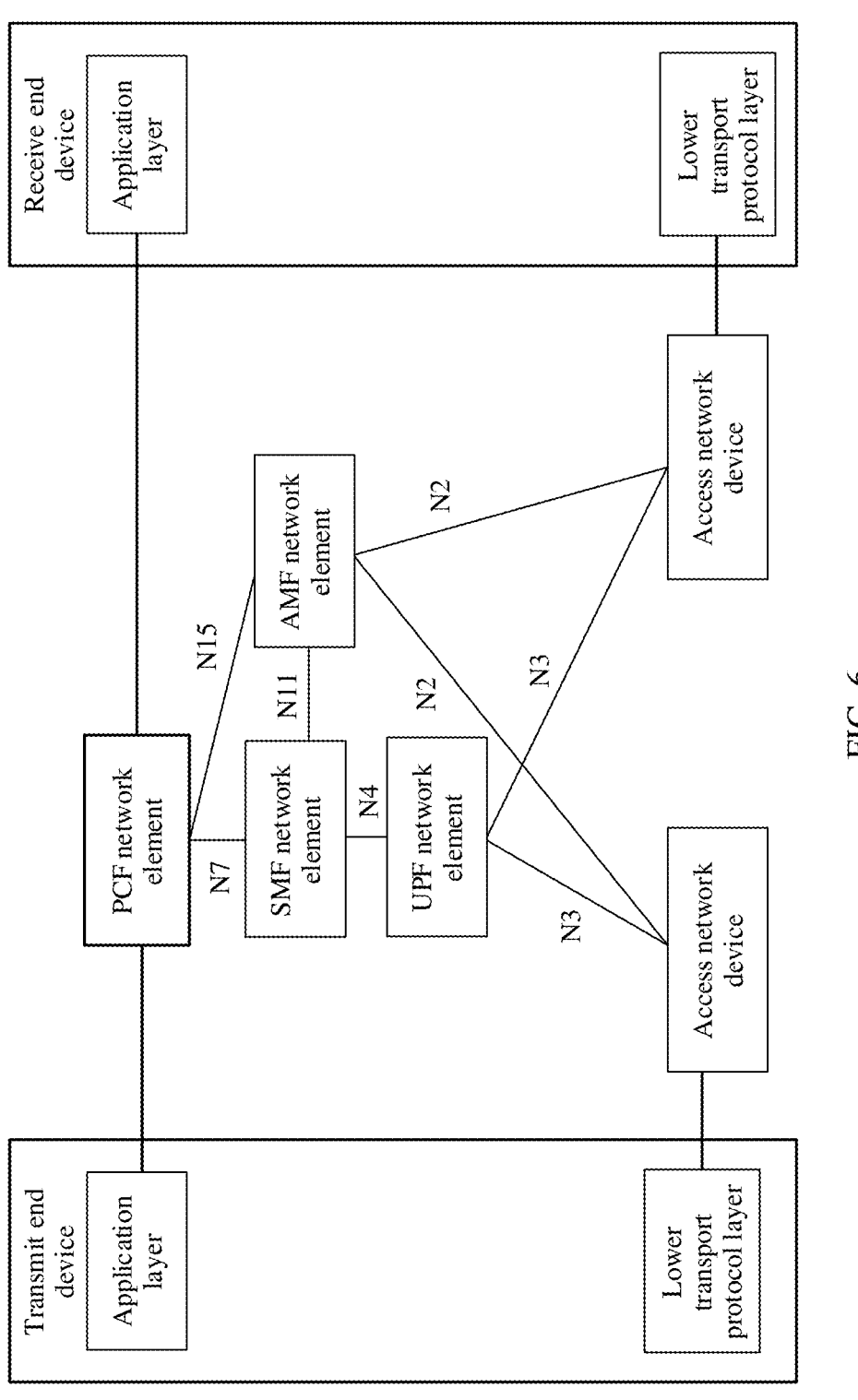
FIG. 6 is a first schematic diagram of an architecture of convergence between an OPC UA and a 5G network according to an embodiment of this application.

For example, it is assumed that the transport network is a 5G network. As shown in FIG. 6, the first device may be a control network element, for example, a policy control function (PCF) network element in the 5G network. In addition, as shown in FIG. 6, the 5G network may further include an access network device, a UPF network element, an SMF network element, an AMF network element, and the like. This is not specifically limited in this embodiment of this application.

Figure 7:
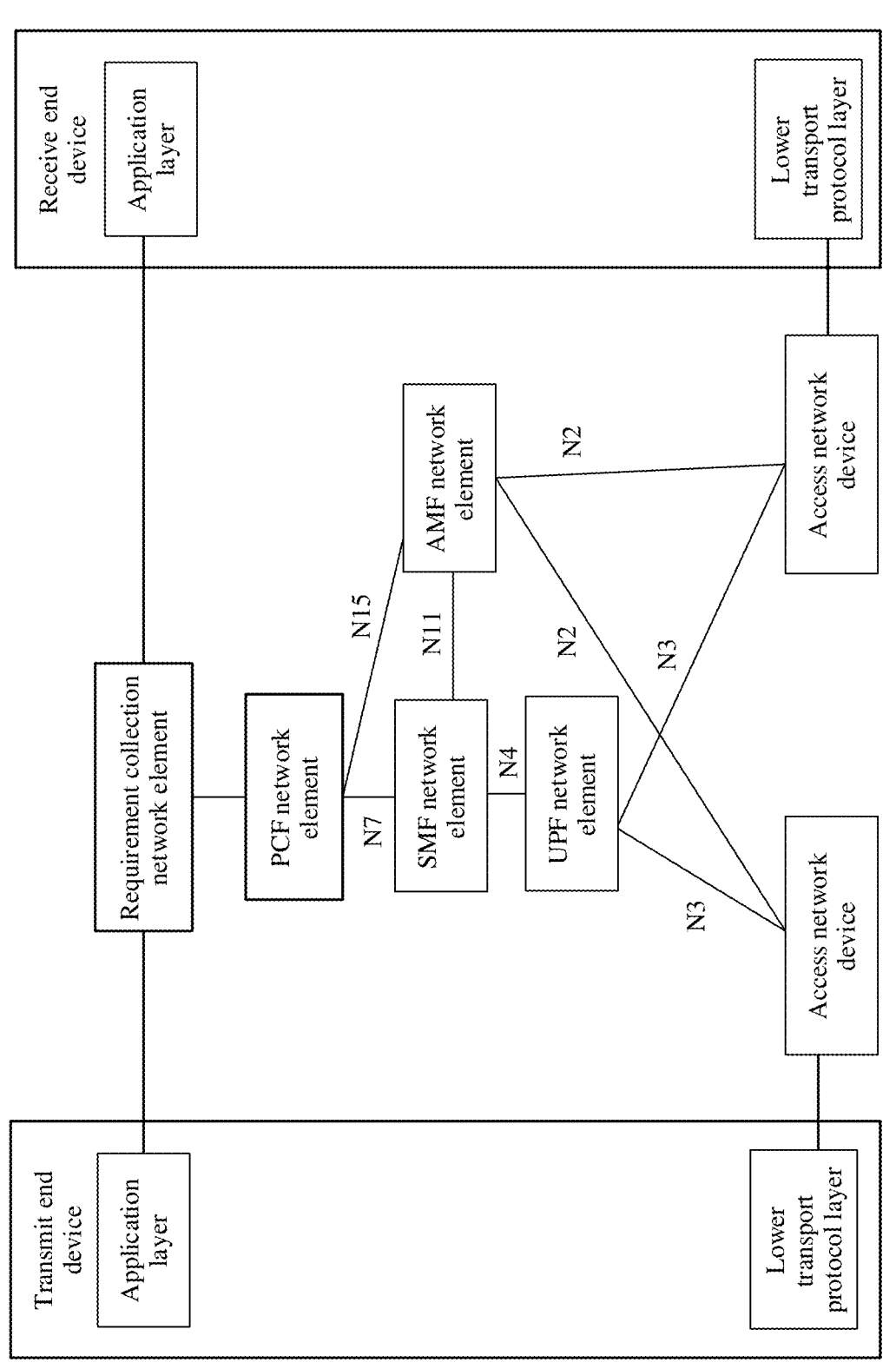
FIG. 7 is a second schematic diagram of an architecture of convergence between an OPC UA and a 5G network according to at least an embodiment of this application.

Alternatively, for example, it is assumed that the transport network is a 5G network. As shown in FIG. 7, the first device may be a control network element, for example, a PCF network element in the 5G network. In addition, as shown in FIG. 7, the 5G network may further include a requirement collection (requirement collection) network element, an access network device, a UPF network element, an SMF network element, an AMF network element, and the like. This is not specifically limited in this embodiment of this application. Certainly, in this embodiment of this application, the requirement collection network element may not belong to the 5G network. This is not specifically limited in this embodiment of this application.

Alternatively, for example, it is assumed that the transport network is a 5G network. As shown in FIG. 7, the first device may be a requirement collection network element in the 5G network. In addition, as shown in FIG. 7, the 5G network may further include an access network device, a UPF network element, an SMF network element, an AMF network element, a PCF network element, and the like. This is not specifically limited in this embodiment of this application. Certainly, in this embodiment of this application, the requirement collection network element may not belong to the 5G network. This is not specifically limited in this embodiment of this application.

As shown in FIG. 6 or FIG. 7, a lower transport protocol layer of the transmit end device or the receive end device communicates with the access network device, and the access network device communicates with the AMF network element through a next generation network (next generation, N) 2 interface (N2 for short). The access network device communicates with the UPF network element through an N3 interface (N3 for short). The AMF network element communicates with the SMF network element through an N11 interface (N11 for short), and the AMF network element communicates with the PCF network element through an N15 interface (N15 for short). The SMF network element communicates with the PCF network element through an N7 interface (N7 for short), and the SMF network element communicates with the UPF network element through an N4 interface (N4 for short).

In some embodiments, the requirement collection network element in the embodiments of this application may parse a data packet of the OPC UA, and may also be referred to as an OPC UA controller (OPC controller), an application management (application engineering) network element, or the like. This is not specifically limited in the embodiments of this application.

In some embodiments, related functions of the first device, the transmit end device, or the receive end device in the embodiments of this application may be implemented by one device, or may be jointly implemented by a plurality of devices, or may be implemented by one or more function modules in one device. This is not specifically limited in the embodiments of this application. It may be understood that the foregoing function may be a network element on a hardware device, a software function run on dedicated hardware, a combination of hardware and software, or a virtualization function instantiated on a platform (for example, a cloud platform).

Figure 8:
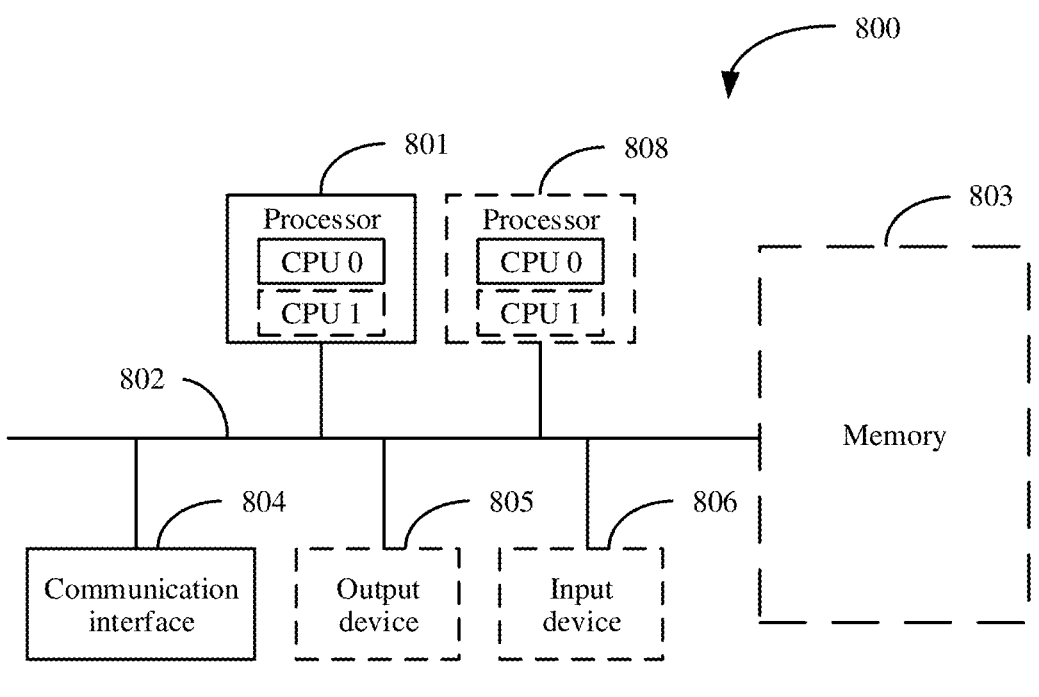
FIG. 8 is a schematic diagram of a structure of a communication device according to at least an embodiment of this application.

For example, the related functions of the first device, the transmit end device, or the receive end device in the embodiments of this application may be implemented by the communication device 800 in FIG. 8. FIG. 8 is a schematic diagram of a structure of a communication device 800 according to an embodiment of this application. The communication device 800 includes one or more processors 801, a communication line 802, and at least one communication interface (in FIG. 8, only an example in which a communication interface 804 and one processor 801 are included is used for description). In some embodiments, the communication device 800 may further include a memory 803.

The processor 801 may be a general-purpose central processing unit (CPU), a microprocessor, an application-specific integrated circuit (ASIC), or one or more integrated circuits configured to control program execution of the solutions in this application.

The communication line 802 may include a path for connecting different components.

The communication interface 804 may be a transceiver module configured to communicate with another device or a communication network, for example, the Ethernet, a RAN, or a wireless local area network (WLAN). For example, the transceiver module may be an apparatus such as a transceiver or a transceiver device. In some embodiments, the communication interface 804 may alternatively be a transceiver circuit located in the processor 801, to implement signal input and signal output of the processor.

The memory 803 may be an apparatus having a storage function. For example, the memory 803 may be, but is not limited to, a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another optical disc storage, an optional disk storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer. The memory may exist independently and is connected to the processor by using the communication line 802. The memory may alternatively be integrated with the processor.

The memory 803 is configured to store computer-executable instructions for executing the solutions of this application, and the processor 801 controls the execution. The processor 801 is configured to execute the computer-executable instructions stored in the memory 803, to implement a method for determining a service transmission requirement provided in the embodiments of this application.

In some embodiments, the processor 801 may perform a processing-related function in a method for determining a service transmission requirement provided in the following embodiments of this application. The communication interface 804 is responsible for communicating with another device or a communication network. This is not specifically limited in this embodiment of this application.

In some embodiments, the computer-executable instructions in the embodiments of this application may also be referred to as application program code. This is not specifically limited in the embodiments of this application.

During specific implementation, in an embodiment, the processor 801 may include one or more CPUs, for example, a CPU 0 and a CPU 1 in FIG. 8.

During specific implementation, in an embodiment, the communication device 800 may include a plurality of processors, for example, the processor 801 and the processor 808 in FIG. 8. Each of the processors may be a single-core (single-CPU) processor, or may be a multi-core (multi-CPU) processor. The processor herein may be one or more devices, circuits, and/or processing cores for processing data (for example, computer program instructions).

During specific implementation, in an embodiment, the communication device 800 may further include an output device 805 and an input device 806. The output device 805 communicates with the processor 801, and may display information in a plurality of manners. For example, the output device 805 may be a liquid crystal display (LCD), a light emitting diode (LED) display device, a cathode ray tube (CRT) display device, or a projector (projector). The input device 806 communicates with the processor 801, and may receive input of a user in a plurality of manners. For example, the input device 806 may be a mouse, a keyboard, a touchscreen device, or a sensing device.

The communication device 800 may also be referred to as a communication apparatus sometimes, and may be a general-purpose device or a dedicated device. For example, the communication device 800 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to the structure shown in FIG. 8. A type of the communication device 800 is not limited in this embodiment of this application.

The following describes in detail the method for determining a service transmission requirement provided in the embodiments of this application with reference to FIG. 1 to FIG. 8.

It should be noted that, in the following embodiments of this application, names of messages between network elements, names of parameters in messages, or the like are merely examples, and there may be other names during specific implementation. This is not specifically limited in the embodiments of this application.

Figure 9A:
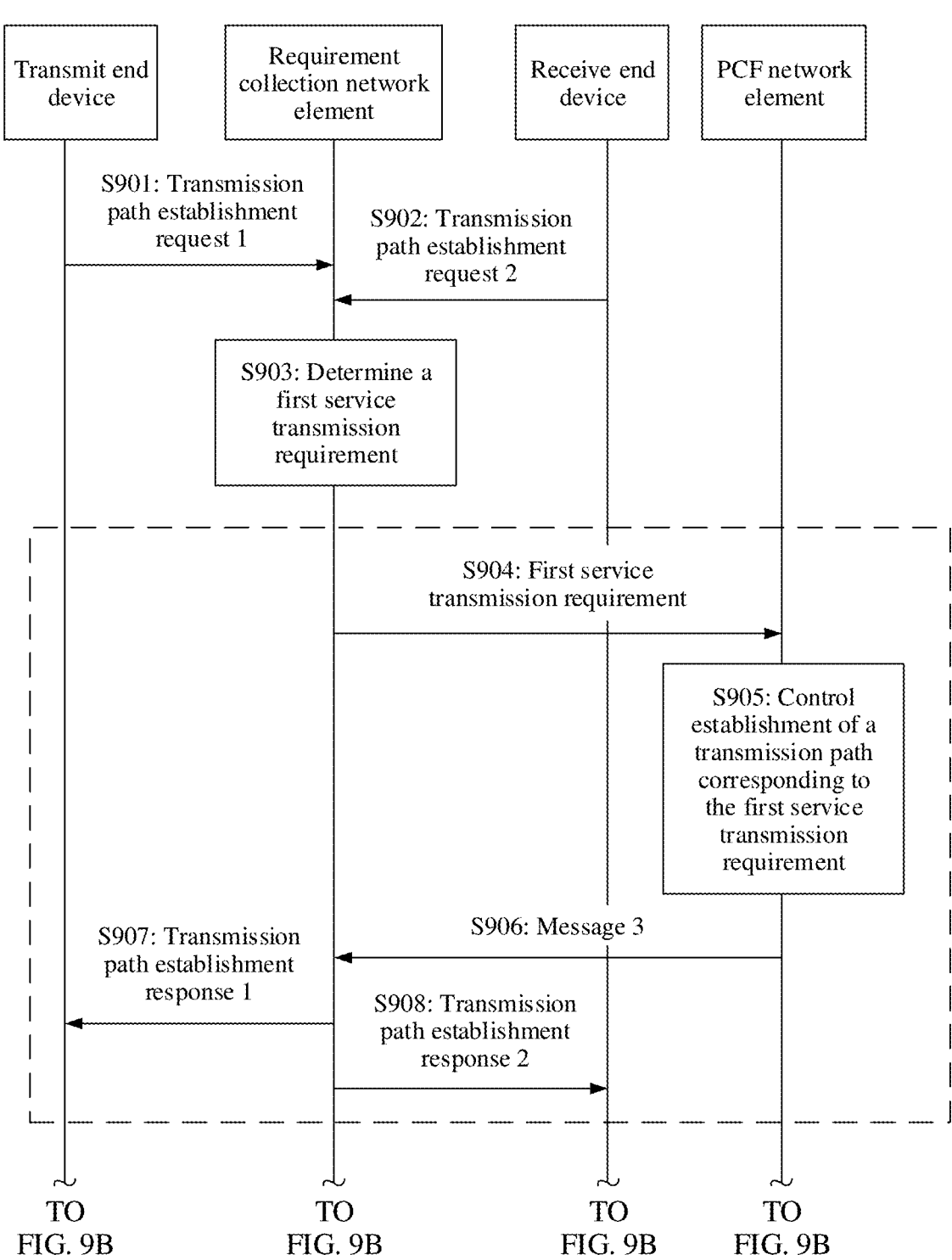
FIG. 9A and FIG. 9B are a first schematic flowchart of a method for determining a service transmission requirement according to at least an embodiment of this application.
Figure 9B:
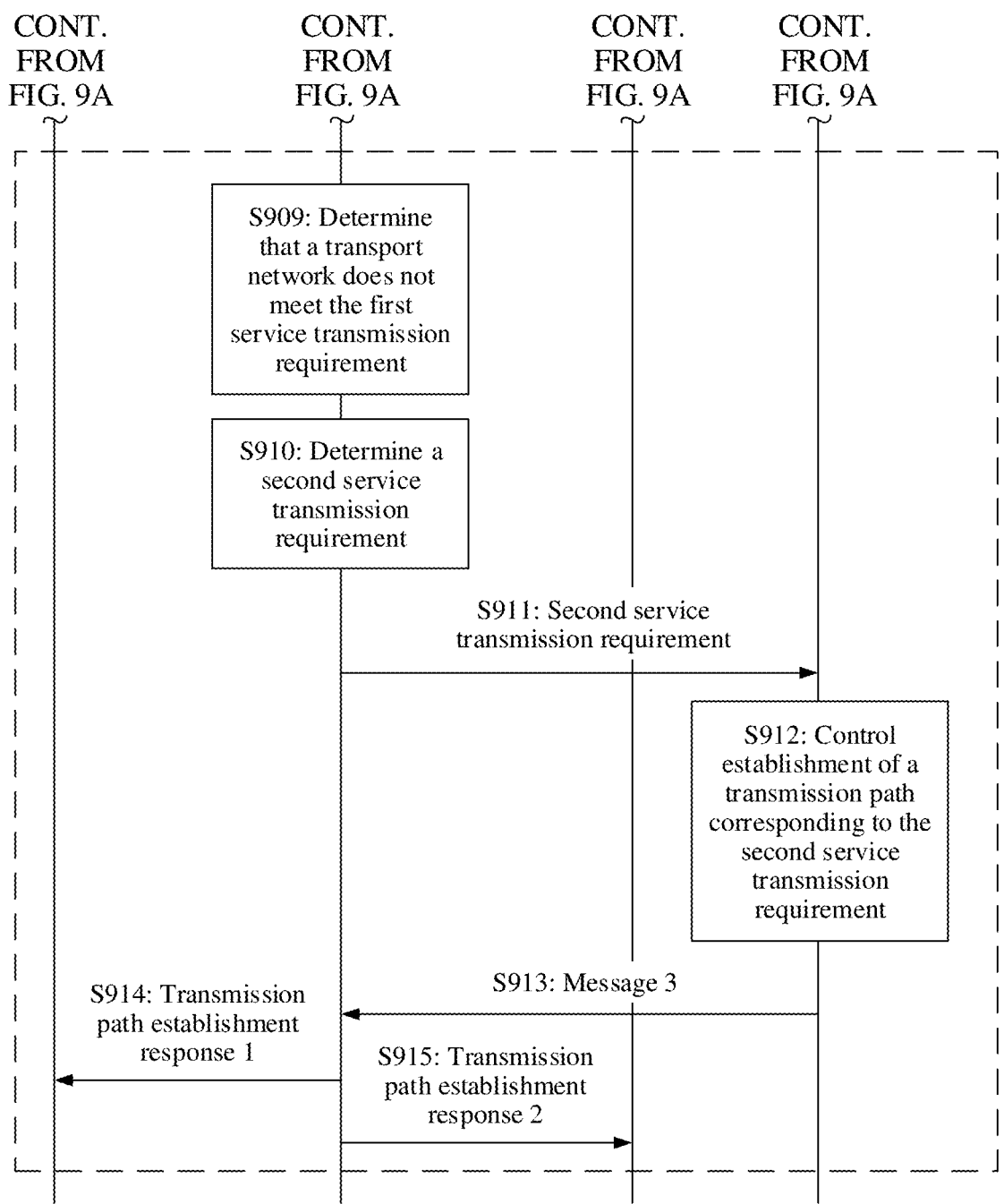

For example, the first device shown in FIG. 5 is the requirement collection network element in FIG. 7. FIG. 9A and FIG. 9B show a method for determining a service transmission requirement according to an embodiment of this application. The method includes the following steps.

S901: A transmit end device sends a message 1 to a requirement collection network element. The requirement collection network element receives the message 1 from the transmit end device. The message 1 includes a first service requirement parameter, and the first service requirement parameter is a service requirement parameter of the transmit end device.

For example, as shown in FIG. 9A and FIG. 9B, the message 1 may be a transmission path establishment request 1.

In some embodiments, communication between the transmit end device and the requirement collection network element may be in an OPC UA client/server mode or a publisher/subscriber mode (pub/sub mode for short below). Specifically, the first service requirement parameter may be defined by using an information model of the OPC UA, and the message 1 may be in an OPC UA format. This is not specifically limited in this embodiment of this application.

In some embodiments, the first service requirement parameter includes one or more of the following parameters:

a size of a data packet sent by the transmit end device;

a time interval at which the transmit end device sends the data packet;

a processing delay of a data packet to be sent by the transmit end device; and a quantity of lost data packets, a quantity of errors, or a data packet loss rate or error rate within a specified time period allowed by the transmit end device.

It should be noted that in this embodiment of this application, sizes of data packets sent by the transmit end device may be the same or may be different. This is not specifically limited in this embodiment of this application.

In some embodiments, the message 1 further includes:

one or more of an identifier of a receive end device, a network storage requirement, or indication information, where the network storage requirement is used to indicate whether a transport network supports storage of the data packet sent by the transmit end device. For example, when the transport network works in a broker mode, it indicates that the transport network supports storage of the data packet sent by the transmit end device. When the transport network works in a brokerless mode, it indicates that the transport network does not support storage of the data packet sent by the transmit end device. The indication information is used to indicate whether the data packet sent by the transmit end device is received by a plurality of receive end devices.

The identifier of the receive end device may be, for example, a MAC address of the receive end device, a publisher ID, or a publisher ID and a writer group ID. In addition, as described above, in a data sending process, one transmit end device may correspond to a plurality of receive end devices. In this case, the identifier of the receive end device may identify a plurality of receive end devices. For example, in this case, the identifier of the receive end device is a list of MAC addresses of a plurality of receive end devices.

The network storage requirement is usually used in the broker mode of the OPC UA. An intermediate network stores a service data packet, and sends the service data packet to different receive end devices based on the requirement.

The indication information may be, for example, a list of MAC addresses of the receive end devices or a multicast service indication.

S902: The receive end device sends a message 2 to the requirement collection network element. The requirement collection network element receives the message 2 from the receive end device.

The message 2 includes a second service requirement parameter, and the second service requirement parameter is a service requirement parameter of the receive end device.

For example, as shown in FIG. 9A and FIG. 9B, the message 2 may be a transmission path establishment request 2.

In some embodiments, communication between the receive end device and the requirement collection network element may be in an OPC UA client/server mode or a pub/sub mode. Specifically, the second service requirement parameter may be defined by using an information model of the OPC UA, and the message 2 may be in an OPC UA format. This is not specifically limited in this embodiment of this application.

In some embodiments, the second service requirement parameter includes a transmission delay of the data packet sent by the transmit end device. The transmission delay of the data packet sent by the transmit end device may be understood as duration from sending the data packet by the transmit end device to receiving the data packet by the receive end device.

In some embodiments, the second service requirement parameter further includes a delay of processing, in the receive end device, the data packet received from the transmit end device, for example, decoding duration or decapsulation duration of the receive end device.

In some embodiments, the message 2 further includes an identifier of the transmit end device.

The identifier of the transmit end device may be, for example, a MAC address of the transmit end device, a publisher ID, or a publisher ID and a writer group ID.

For example, Table 1 is an example of a service requirement parameter according to an embodiment of this application. Table 1 uses data transmission in the OPC UA pub/sub mode as an example for description. Therefore, the transmit end device is a publisher, and the receive end device is a subscriber. The writer group QoS is a service requirement parameter group of the transmit end device. The reader QoS is a service requirement parameter group of the receive end device.

TABLE 1

| Parameter position | Service requirement parameter |
| --- | --- |
| Writer group QoS (publisher) | Time interval at which the transmit end device sends a data packet |
| | Size of a data packet sent by the transmit end device |
| | Quantity of network layer data packets sent in each time interval |
| | Processing delay of a data packet to be sent by the transmit end device |

TABLE 1-continued

| Parameter position | Service requirement parameter |
| --- | --- |
| Reader QoS (subscriber) | Transmission delay of a data packet sent by the transmit end device Delay of processing, in the receive end device, the data packet received from the transmit end device |

It should be noted that step S901 and step S902 are not performed in a necessary sequence. Step S901 may be performed before step S902; or step S902 may be performed before step S901; or step S901 and step S902 may be simultaneously performed. This is not specifically limited in this embodiment of this application. In a possible implementation, the two devices simultaneously enable or receive a trigger message, and perform a corresponding operation.

S903: The requirement collection network element determines a first service transmission requirement between the transmit end device and the receive end device based on the first service requirement parameter in the message 1 and the second service requirement parameter in the message 2.

In some embodiments, as shown in FIG. 9A and FIG. 9B, after step S903, the method for determining a service transmission requirement provided in this embodiment of this application may further include the following steps S904 to S908.

S904: The requirement collection network element sends the first service transmission requirement to a control network element (an example in which the control network element is a PCF network element is used in this embodiment of this application) in a transport network. The PCF network element receives the first service transmission requirement from the requirement collection network element.

S905: The PCF network element controls establishment of a transmission path corresponding to the first service transmission requirement.

In some embodiments, that the PCF network element controls establishment of a transmission path corresponding to the first service transmission requirement includes: The PCF network element determines, based on the first service transmission requirement, a PCC rule corresponding to the service, and sends the PCC rule to an SMF network element. Then, the SMF network element can establish, based on a QoS flow establishment procedure shown in FIG. 2, a transmission path corresponding to the first service transmission requirement. For related descriptions, refer to FIG. 2. Details are not described herein again for brevity.

For example, that the PCF network element determines, based on the first service transmission requirement, a PCC rule corresponding to the service may include: The PCF network element may determine, based on a service data receive delay in the first service transmission requirement and a processing delay of the transmit end device/receive end device, a transmission delay that is guaranteed for the transmission path, and/or the PCF network element may determine, based on a size of the service data packet and a transmission interval, a transmission bandwidth that is guaranteed for the transmission path.

In some embodiments, the requirement collection network element may further decompose the first service transmission requirement into a service requirement from the transmit end device to the transport network and a service requirement from the receive end device to the transport network. Then, the requirement collection network element sends, to the PCF network element, the service requirement from the receive end device to the transport network and the service requirement from the transmit end device to the transport network. Therefore, the PCF network element separately establishes a transmission path, from the receive end device to the transport network, corresponding to the service requirement from the receive end device to the transport network, and a transmission path, from the transmit end device to the transport network, corresponding to the service requirement from the transmit end device to the transport network. This is not specifically limited in this embodiment of this application.

S906: After the establishment of the transmission path corresponding to the first service transmission requirement is completed, the PCF network element sends a message 3 to the requirement collection network element, and the requirement collection network element receives the message 3 from the PCF network element. The message 3 is used to indicate that the establishment of the transmission path is completed.

S907: The requirement collection network element sends a message 4 to the transmit end device. The transmit end device receives the message 4 from the requirement collection network element. The message 4 is used to indicate that the establishment of the transmission path is completed.

For example, as shown in FIG. 9A and FIG. 9B, the message 4 may be a transmission path establishment response 1.

In some embodiments, the message 4 may be in an OPC UA client/server mode or a pub/sub mode. Specifically, the message 4 may be encapsulated and sent in an OPC UA format. This is not specifically limited in this embodiment of this application.

In some embodiments, the message 4 may include a moment at which the transmit end device sends the data packet, to indicate when the transmit end device can send the data packet.

In some embodiments, the message 4 may include an identifier of the transmission path, to complete mapping between an application layer data flow and a lower-layer transmission path. The identifier of the transmission path may be, for example, one or more of a session identifier (session ID), a flow identifier (flow ID), a MAC address, an IP address, or a port number.

It should be noted that, actually, in this embodiment of this application, that the transmit end device receives the message 4 from the requirement collection network element is that an application layer of the transmit end device receives the message 4 from the requirement collection network element. In this way, when the data packet is sent, the application layer may notify a lower transport protocol layer, and the lower transport protocol layer sends the data packet to the receive end device based on the identifier of the transmission path obtained in the process of establishing the transmission path corresponding to the first service transmission requirement.

S908: The requirement collection network element sends a message 5 to the receive end device. The receive end device receives the message 5 from the requirement collection network element. The message 5 is used to indicate that the establishment of the transmission path is completed.

For example, as shown in FIG. 9A and FIG. 9B, the message 5 may be a transmission path establishment response 2.

In some embodiments, the message 5 may be in an OPC UA client/server mode or a pub/sub mode. Specifically, the message 5 may be encapsulated and sent in an OPC UA format. This is not specifically limited in this embodiment of this application.

In some embodiments, the message 5 may include a moment at which the transmit end device sends the data packet, to indicate when the transmit end device can send the data packet.

In some embodiments, the message 5 may include an identifier of the transmission path, to complete mapping between an application layer data flow and a lower-layer transmission path. The identifier of the transmission path may be, for example, one or more of a session identifier (session ID), a flow identifier (flow ID), a MAC address, an IP address, or a port number.

It should be noted that, actually, in this embodiment of this application, that the receive end device receives the message 5 from the requirement collection network element is that an application layer of the receive end device receives the message 5 from the requirement collection network element. In this way, the application layer may obtain a receiving occasion of the data packet based on the moment at which the transmit end device sends the data packet, so that the application layer can receive the data packet from the transmit end device in time.

It should be noted that step S907 and step S908 are not performed in a necessary sequence. Step S907 may be performed before step S908; or step S908 may be performed before step S907; or step S907 and step S908 may be simultaneously performed. This is not specifically limited in this embodiment of this application.

In some embodiments, considering that when an industrial network performs data packet transmission by using a cellular network, due to limited cellular network resources, there may be a scenario in which a service requirement of the industrial network cannot be met. Therefore, in this embodiment of this application, the message 1 and/or the message 2 further include a service requirement negotiation indication or a service requirement list, to indicate the requirement collection network element that the transmit end device and/or the receive end device support service requirement adjustment.

It should be noted that, in this embodiment of this application, the service requirement adjustment is mainly that when the transport network does not meet the first service transmission requirement, the transmit end device and the receive end device are willing to adjust the service requirement based on a network resource status, so that the transport network may establish a transmission path for the adjusted service requirement.

Further, as shown in FIG. 9A and FIG. 9B, after step S903, the method for determining a service transmission requirement provided in this embodiment of this application may further include the following steps S909 to S915.

S909: The requirement collection network element determines that the transport network does not meet the first service transmission requirement.

In some embodiments, the requirement collection network element may determine, based on a policy and a resource of the network, optionally, based on a requirement negotiation indication and the like, that the current transport network cannot meet the first service transmission requirement.

In some embodiments, the policy and the resource of the network in the requirement collection network element may be indicated by the PCF network element. Unified descriptions are provided herein. Details are described below again.

S910: The requirement collection network element obtains a second service transmission requirement, where the second service transmission requirement is an updated service transmission requirement corresponding to the first service transmission requirement.

In a possible implementation, that the requirement collection network element obtains a second service transmission requirement includes: The requirement collection network element sends a modified application requirement (modified application requirement) 1 to the transmit end device, where the modified application requirement 1 carries an updated service requirement parameter of the transmit end device. The requirement collection network element receives a transmission path establishment acknowledgment 1 from the transmit end device, where the transmission path establishment acknowledgment 1 is used to acknowledge that a change of a service requirement parameter of the transmit end device is allowed. The requirement collection network element determines the second service transmission requirement based on a second service requirement parameter and the updated service requirement parameter of the transmit end device.

In another possible implementation, that the requirement collection network element obtains a second service transmission requirement includes: The requirement collection network element sends a modified application requirement 2 to the receive end device, where the modified application requirement 2 carries an updated service requirement parameter of the receive end device. The requirement collection network element receives a transmission path establishment acknowledgment 2 from the receive end device, where the transmission path establishment acknowledgment 2 is used to acknowledge that a change of a service requirement parameter of the receive end device is allowed. The requirement collection network element determines the second service transmission requirement based on a first service requirement parameter and the updated service requirement parameter of the receive end device.

In still another possible implementation, that the requirement collection network element obtains a second service transmission requirement includes: The requirement collection network element sends a modified application requirement 1 to the transmit end device, where the modified application requirement 1 carries an updated service requirement parameter of the transmit end device. The requirement collection network element receives a transmission path establishment acknowledgment 1 from the transmit end device, where the transmission path establishment acknowledgment 1 is used to acknowledge that a change of a service requirement parameter of the transmit end device is allowed. The requirement collection network element sends a modified application requirement 2 to the receive end device, where the modified application requirement 2 carries an updated service requirement parameter of the receive end device. The requirement collection network element receives a transmission path establishment acknowledgment 2 from the receive end device, where the transmission path establishment acknowledgment 2 is used to acknowledge that a change of a service requirement parameter of the receive end device is allowed. The requirement collection network element determines the second service transmission requirement based on the updated service requirement parameter of the transmit end device and the updated service requirement parameter of the receive end device.

In some embodiments, if either the transmit end device or the receive end device rejects the change of the service requirement parameter, the transmission path cannot be established between the transmit end device and the receive end device, and this procedure ends. Unified descriptions are provided herein. Details are not described below again for brevity.

In some embodiments, the updated service requirement parameter of the transmit end device carried in the modified application requirement 1, and/or the updated service requirement parameter of the receive end device carried in the modified application requirement 2 may be sent by the control network element (for example, a PCF network element) in the transport network to the requirement collection network element. This is not specifically limited in this embodiment of this application.

S911 to S915 are similar to steps S904 to S908, and a difference is, for example, that the first service transmission requirement in steps S904 to S908 is replaced with the second service transmission requirement in steps S911 to S915. For related descriptions, refer to the foregoing steps S904 to S908. Details are not described herein again for brevity.

Based on the method for determining a service transmission requirement provided in this embodiment of this application, on one hand, the transport network can obtain the service transmission requirement of the industrial device. On the other hand, the control network element in the transport network can control, based on the obtained service transmission requirement of the industrial device, the establishment of the transmission path corresponding to the service transmission requirement in the transport network. In this way, the data packet can be transmitted between the transmit end device and the receive end device.

The actions of the requirement collection network element, the transmit end device, the receive end device, or the PCF network element in steps S901 to S915 may be performed by the processor 801 in the communication device 800 shown in FIG. 8 by invoking the application program code stored in the memory 803. This is not limited in this embodiment.

Figure 10A:
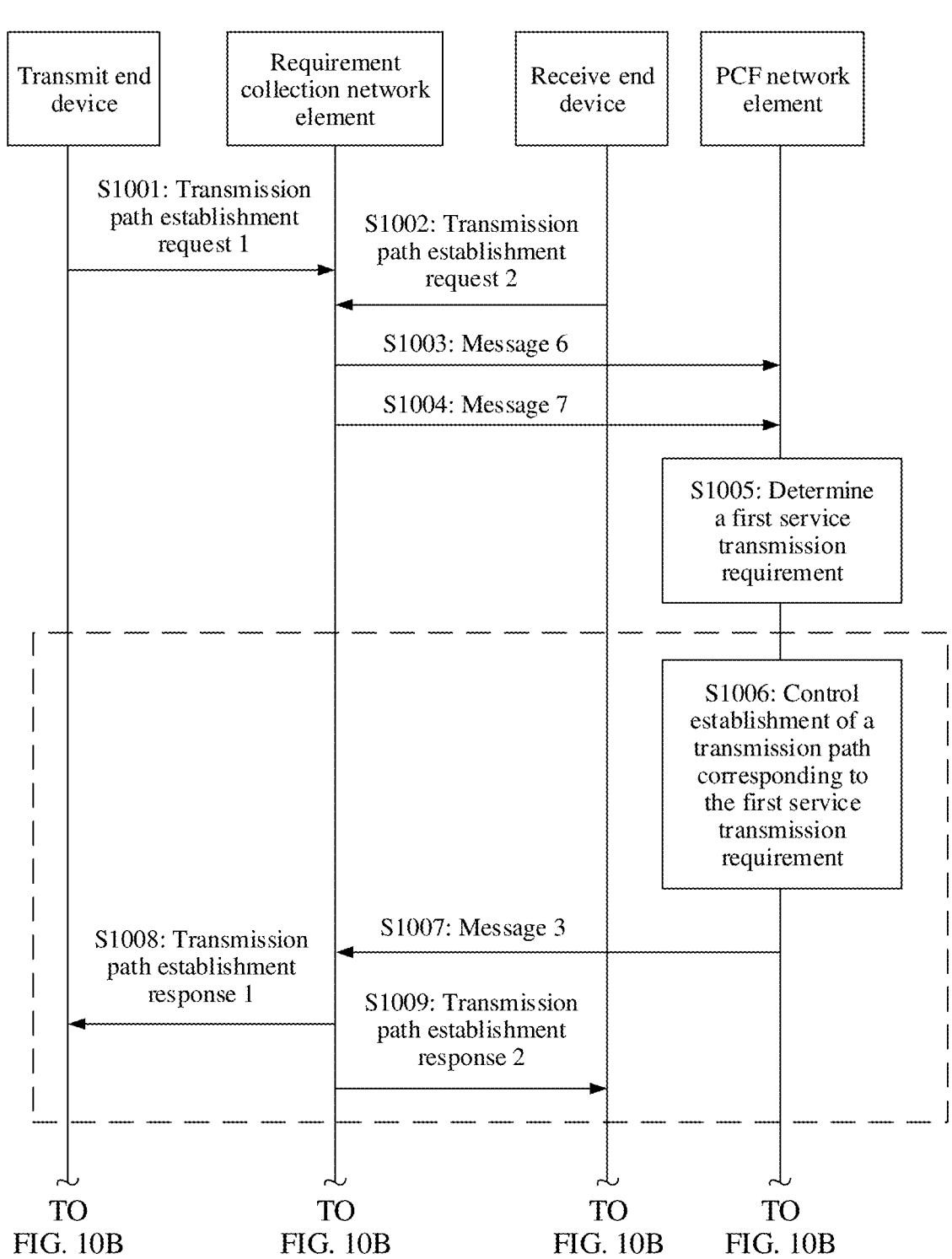
FIG. 10A and FIG. 10B are a second schematic flowchart of a method for determining a service transmission requirement according to at least an embodiment of this application.
Figure 10B:
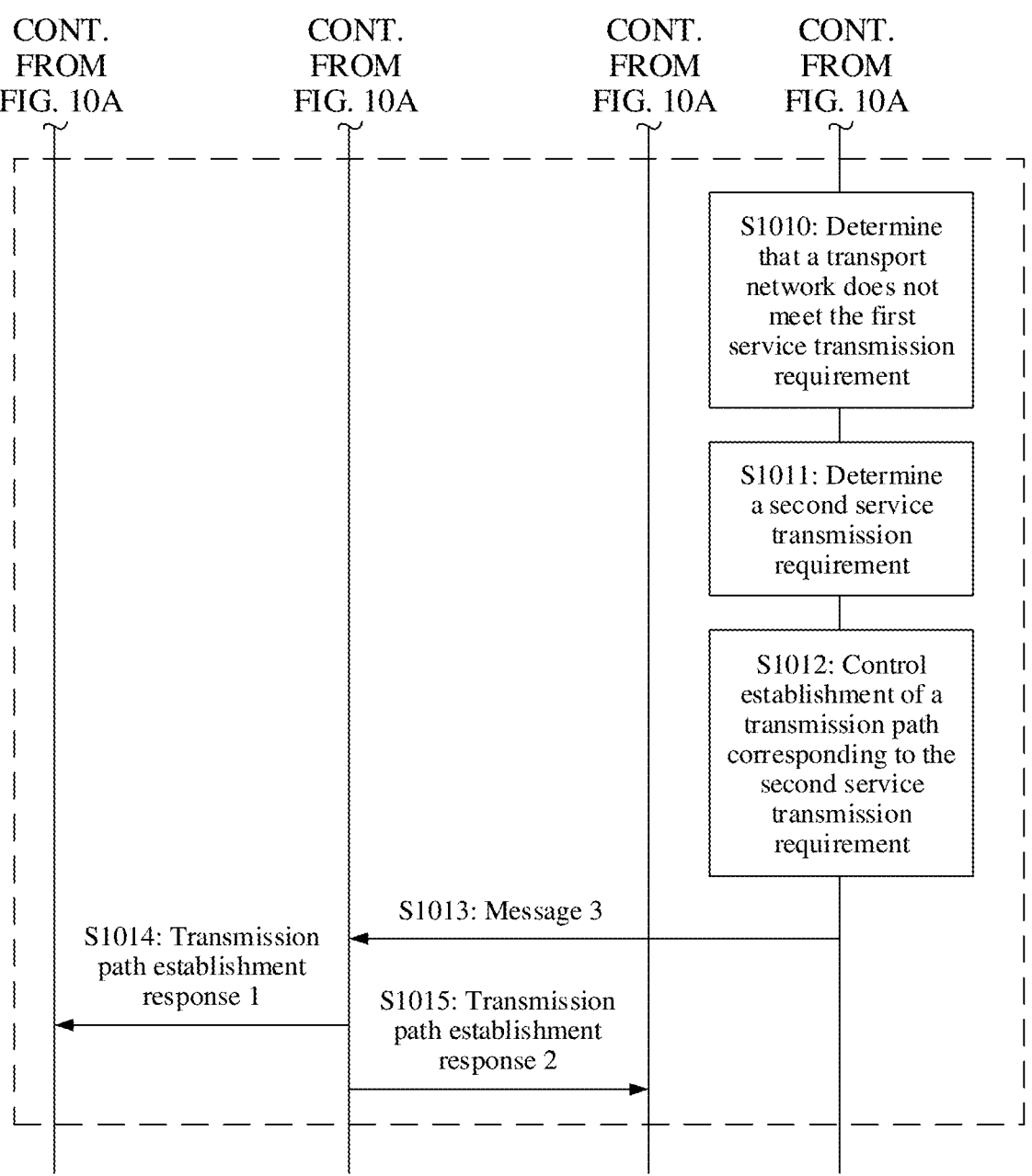

Alternatively, an example in which the first device shown in FIG. 5 is the control network element (where the control network element is a PCF network element) in FIG. 7 is used. FIG. 10A and FIG. 10B show another method for determining a service transmission requirement according to an embodiment of this application. The method includes the following steps.

S1001 and S1002 are the same as steps S901 and S902. For related descriptions, refer to the embodiment shown in FIG. 9A and FIG. 9B. Details are not described herein again for brevity.

S1003: The requirement collection network element sends a message 6 to a PCF network element. The PCF network element receives the message 6 from the requirement collection network element.

The message 6 carries the parameter in the message 1. Details are not described herein again for brevity.

S1004: The requirement collection network element sends a message 7 to the PCF network element. The PCF network element receives the message 7 from the requirement collection network element.

The message 7 carries the parameter in the message 2. Details are not described herein again for brevity.

In some embodiments, the requirement collection network element may alternatively send the parameter in the message 1 and the parameter in the message 2 to the PCF network element by using one message. This is not specifically limited in this embodiment of this application.

S1005: The PCF network element determines a first service transmission requirement between the transmit end device and the receive end device based on a first service requirement parameter and a second service requirement parameter.

In some embodiments, as shown in FIG. 10A and FIG. 10B, after step S1005, the method for determining a service transmission requirement provided in this embodiment of this application may further include the following steps S1006 to S1009.

S1006: The PCF network element controls establishment of a transmission path corresponding to the first service transmission requirement.

For related implementation of step S1006, refer to step S905 in the embodiment shown in FIG. 9A and FIG. 9B. Details are not described herein again for brevity.

In some embodiments, the PCF network element may alternatively determine a service requirement from the transmit end device to the transport network based on the first service requirement parameter. The PCF network element determines a service requirement from the receive end device to the transport network based on the second service requirement parameter. Further, the PCF network element separately establishes a transmission path, from the receive end device to the transport network, corresponding to the service requirement from the receive end device to the transport network, and a transmission path, from the transmit end device to the transport network, corresponding to the service requirement from the transmit end device to the transport network. This is not specifically limited in this embodiment of this application.

S1007 to S1009 are the same as steps S906 to S908. For related descriptions, refer to the embodiment shown in FIG. 9A and FIG. 9B. Details are not described herein again for brevity.

In some embodiments, considering that when an industrial network performs data packet transmission by using a cellular network, due to limited cellular network resources, there may be a scenario in which a service requirement of the industrial network cannot be met. Therefore, in this embodiment of this application, the message 1 and/or the message 2 further include a service requirement negotiation indication or a service requirement list, to indicate the requirement collection network element that the transmit end device and/or the receive end device support service requirement adjustment.

It should be noted that, in this embodiment of this application, the service requirement adjustment is mainly that when the transport network does not meet the first service transmission requirement, the transmit end device and the receive end device are willing to adjust the service requirement based on a network resource status, so that the transport network may establish a transmission path for the adjusted service requirement.

Further, as shown in FIG. 10A and FIG. 10B, after step S1005, the method for determining a service transmission requirement provided in this embodiment of this application may further include the following steps S1010 to S1015.

S1010: The PCF network element determines that the transport network does not meet the first service transmission requirement.

In some embodiments, the PCF network element may determine, based on a policy and a resource of the network, optionally, based on a requirement negotiation indication and the like, that the current transport network cannot meet the first service transmission requirement.

S1011: The PCF network element obtains a second service transmission requirement, where the second service transmission requirement is an updated service transmission requirement corresponding to the first service transmission requirement.

In a possible implementation, that the PCF network element obtains a second service transmission requirement includes: The PCF network element sends a modified application requirement 3 to the requirement collection network element, where the modified application requirement 3 carries an updated service requirement parameter of the transmit end device. The requirement collection network element sends a modified application requirement 1 to the transmit end device, where the modified application requirement 1 carries the updated service requirement parameter of the transmit end device. The PCF network element receives a transmission path establishment acknowledgment 3 from the requirement collection network element, where the transmission path establishment acknowledgment 3 is used to acknowledge that a change of a service requirement parameter of the transmit end device is allowed. The transmission path establishment acknowledgment 3 is triggered after the requirement collection network element receives a transmission path establishment acknowledgment 1 from the transmit end device, where the transmission path establishment acknowledgment 1 is used to acknowledge that a change of a service requirement parameter of the transmit end device is allowed. The PCF network element determines the second service transmission requirement based on the second service requirement parameter and the updated service requirement parameter of the transmit end device.

In another possible implementation, that the PCF network element obtains a second service transmission requirement includes: The PCF network element sends a modified application requirement 4 to the requirement collection network element, where the modified application requirement 4 carries an updated service requirement parameter of the receive end device. The requirement collection network element sends a modified application requirement 2 to the receive end device, where the modified application requirement 2 carries the updated service requirement parameter of the receive end device. The PCF network element receives a transmission path establishment acknowledgment 4 from the requirement collection network element, where the transmission path establishment acknowledgment 4 is used to acknowledge that a change of a service requirement parameter of the receive end device is allowed. The transmission path establishment acknowledgment 4 is triggered after the requirement collection network element receives a transmission path establishment acknowledgment 2 from the receive end device, where the transmission path establishment acknowledgment 2 is used to acknowledge that a change of a service requirement parameter of the receive end device is allowed. The PCF network element determines the second service transmission requirement based on the first service requirement parameter and the updated service requirement parameter of the receive end device.

In still another possible implementation, that the PCF network element obtains a second service transmission requirement includes: The PCF network element sends a modified application requirement 3 to the requirement collection network element, where the modified application requirement 3 carries an updated service requirement parameter of the transmit end device. The requirement collection network element sends a modified application requirement 1 to the transmit end device, where the modified application requirement 1 carries the updated service requirement parameter of the transmit end device. The PCF network element receives a transmission path establishment acknowledgment 3 from the requirement collection network element, where the transmission path establishment acknowledgment 3 is used to acknowledge that a change of a service requirement parameter of the transmit end device is allowed. The transmission path establishment acknowledgment 3 is triggered after the requirement collection network element receives a transmission path establishment acknowledgment 1 from the transmit end device, where the transmission path establishment acknowledgment 1 is used to acknowledge that a change of a service requirement parameter of the transmit end device is allowed. The PCF network element sends a modified application requirement 4 to the requirement collection network element, where the modified application requirement 4 carries an updated service requirement parameter of the receive end device. The requirement collection network element sends a modified application requirement 2 to the receive end device, where the modified application requirement 2 carries the updated service requirement parameter of the receive end device. The PCF network element receives a transmission path establishment acknowledgment 4 from the requirement collection network element, where the transmission path establishment acknowledgment 4 is used to acknowledge that a change of a service requirement parameter of the receive end device is allowed. The transmission path establishment acknowledgment 4 is triggered after the requirement collection network element receives a transmission path establishment acknowledgment 2 from the receive end device, where the transmission path establishment acknowledgment 2 is used to acknowledge that a change of a service requirement parameter of the receive end device is allowed. The PCF network element determines the second service transmission requirement based on the updated service requirement parameter of the transmit end device and the updated service requirement parameter of the receive end device.

In some embodiments, if either the transmit end device or the receive end device rejects the change of the service requirement parameter, the transmission path cannot be established between the transmit end device and the receive end device, and this procedure ends. Unified descriptions are provided herein. Details are not described below again for brevity.

S1012 to S1015 are similar to steps S1006 to S1009, and a difference is, for example, that the first service transmission requirement in steps S1006 to S1009 is replaced with the second service transmission requirement in steps S1012 to S1015. For related descriptions, refer to the foregoing steps S1006 to S1009. Details are not described herein again for brevity.

Based on the method for determining a service transmission requirement provided in this embodiment of this application, on one hand, the transport network can obtain the service transmission requirement of the industrial device. On the other hand, the control network element in the transport network can control, based on the obtained service transmission requirement of the industrial device, the establishment of the transmission path corresponding to the service transmission requirement in the transport network. In this way, the data packet can be transmitted between the transmit end device and the receive end device.

The actions of the PCF network element, the transmit end device, the receive end device, or the requirement collection network element in steps S1001 to S1015 may be performed by the processor 801 in the communication device 800 shown in FIG. 8 by invoking the application program code stored in the memory 803. This is not limited in this embodiment.

Figure 11:
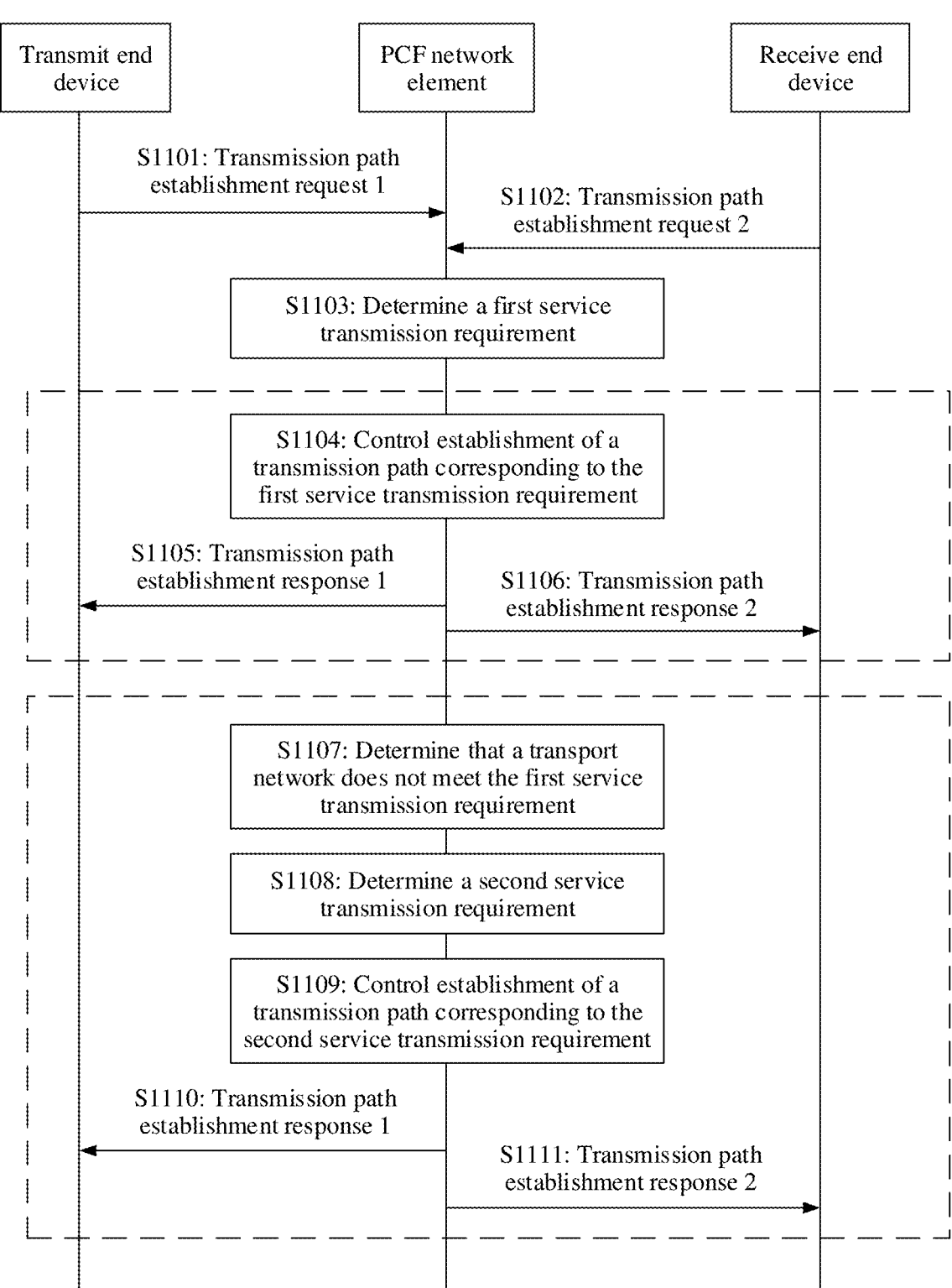
FIG. 11 is a third schematic flowchart of a method for determining a service transmission requirement according to at least an embodiment of this application.

Alternatively, an example in which the first device shown in FIG. 5 is the control network element (where the control network element is a PCF network element) in FIG. 6 is used. FIG. 11 shows another method for determining a service transmission requirement according to an embodiment of this application. The method includes the following steps.

S1101 to S1103 are similar to steps S901 to S903 in the embodiment shown in FIG. 9A and FIG. 9B, and a difference is, for example, that the requirement collection network element in steps S901 to S903 is replaced with the PCF network element in steps S1101 to S1103. For related descriptions, refer to the embodiment shown in FIG. 9A and FIG. 9B. Details are not described herein again for brevity.

S1104: The PCF network element controls establishment of a transmission path corresponding to the first service transmission requirement.

For related descriptions of step S1104, refer to step S905 in the embodiment shown in FIG. 9A and FIG. 9B. Details are not described herein again for brevity.

In some embodiments, the PCF network element may alternatively determine a service requirement from the transmit end device to the transport network based on the first service requirement parameter. The PCF network element determines a service requirement from the receive end device to the transport network based on the second service requirement parameter. Further, the PCF network element separately establishes a transmission path, from the receive end device to the transport network, corresponding to the service requirement from the receive end device to the transport network, and a transmission path, from the transmit end device to the transport network, corresponding to the service requirement from the transmit end device to the transport network. This is not specifically limited in this embodiment of this application.

S1105: After the establishment of the transmission path corresponding to the first service transmission requirement is completed, the PCF network element sends a message 4 to the transmit end device. The transmit end device receives the message 4 from the PCF network element. The message 4 is used to indicate that the establishment of the transmission path is completed.

For related descriptions of step S1105, refer to step S907 in the embodiment shown in FIG. 9A and FIG. 9B. Details are not described herein again for brevity.

S1106: After the establishment of the transmission path corresponding to the first service transmission requirement is completed, the PCF network element sends a message 5 to the receive end device. The receive end device receives the message 5 from the PCF network element. The message 5 is used to indicate that the establishment of the transmission path is completed.

For related descriptions of step S1106, refer to step S908 in the embodiment shown in FIG. 9A and FIG. 9B. Details are not described herein again for brevity.

It should be noted that step S1105 and step S1106 are not performed in a necessary sequence. Step S1105 may be performed before step S1106; or step S1106 may be performed before step S1105; or step S1105 and step S1106 may be simultaneously performed. This is not specifically limited in this embodiment of this application.

In some embodiments, considering that when an industrial network performs data packet transmission by using a cellular network, due to limited cellular network resources, there may be a scenario in which a service requirement of the industrial network cannot be met. Therefore, in this embodiment of this application, the message 1 and/or the message 2 further include a service requirement negotiation indication or a service requirement list, to indicate the PCF network element that the transmit end device and/or the receive end device support service requirement adjustment.

It should be noted that, in this embodiment of this application, the service requirement adjustment is mainly that when the transport network does not meet the first service transmission requirement, the transmit end device and the receive end device are willing to adjust the service requirement based on a network resource status, so that the transport network may establish a transmission path for the adjusted service requirement.

Further, as shown in FIG. 11, after step S1103, the method for determining a service transmission requirement provided in this embodiment of this application may further include the following steps S1107 to S1111.

S1107 and S1108 are similar to steps S909 and S910 in the embodiment shown in FIG. 9A and FIG. 9B, and a difference is, for example, that the requirement collection network element in steps S909 and S910 is replaced with the PCF network element in steps S1107 and S1108. For related descriptions, refer to the embodiment shown in FIG. 9A and FIG. 9B. Details are not described herein again for brevity.

S1109 to S1111 are similar to steps S1104 to S1106, a difference is, for example, that the first service transmission requirement in steps S1104 to S1106 is replaced with the second service transmission requirement in steps S1109 to S1111. For related descriptions, refer to the foregoing steps S1104 to S1106. Details are not described herein again for brevity.

Based on the method for determining a service transmission requirement provided in this embodiment of this application, on one hand, the transport network can obtain the service transmission requirement of the industrial device. On the other hand, the control network element in the transport network can control, based on the obtained service transmission requirement of the industrial device, the establishment of the transmission path corresponding to the service transmission requirement in the transport network. In this way, the data packet can be transmitted between transmit end device and the receive end device.

The actions of the transmit end device, the receive end device, or the PCF network element in steps S1101 to S1111 may be performed by the processor 801 in the communication device 800 shown in FIG. 8 by invoking the application program code stored in the memory 803. This is not limited in this embodiment.

It should be noted that in the embodiments of this application, an example in which an industrial application layer uses the OPC UA is used for description. However, a person skilled in the art can easily understand that the industrial application layer is not limited to an OPC UA application layer mechanism. For example, the industrial application layer may further support various mainstream industrial application technologies such as a distributed control system (DCS) and a profinet. The method for determining a service transmission requirement provided in the embodiments of this application is also applicable to another application layer mechanism. Unified descriptions are provided herein. Details are not described below again for brevity.

It may be understood that, in the foregoing embodiments, methods and/or steps implemented by the first device (including the requirement collection network element or the PCF network element) may alternatively be implemented by a component that can be used in the first device. Methods and/or steps implemented by the transmit end device may alternatively be implemented by a component that can be used in the transmit end device. Methods and/or steps implemented by the receive end device may alternatively be implemented by a component that can be used in the receive end device.

The foregoing mainly describes the solutions provided in the embodiments of this application from a perspective of interaction between network elements. Correspondingly, an embodiment of this application further provides a communication apparatus. The communication apparatus may be the first device in the foregoing method embodiment, an apparatus including the foregoing first device, or a component that can be used in the first device. Alternatively, the communication apparatus may be the receive end device in the foregoing method embodiment, an apparatus including the receive end device, or a component that can be used in the receive end device. Alternatively, the communication apparatus may be the transmit end device in the foregoing method embodiment, an apparatus including the transmit end device, or a component that can be used in the transmit end device. It may be understood that, to implement the foregoing functions, the communication apparatus includes a corresponding hardware structure and/or software module for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12:
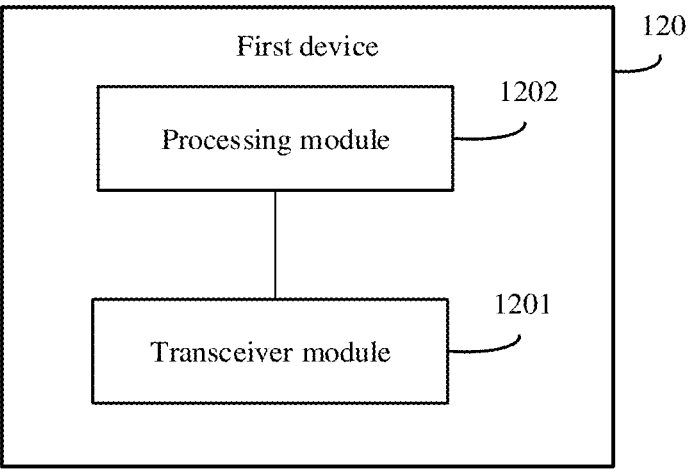
FIG. 12 is a schematic diagram of a structure of a first device according to at least an embodiment of this application.

For example, in an example in which the communication apparatus is the first device in the foregoing method embodiment, FIG. 12 is a schematic diagram of a structure of a first device 120. The first device 120 includes a transceiver module 1201 and a processing module 1202. The transceiver module 1201 may also be referred to as a transceiver unit, and is configured to implement a transceiver function. For example, the transceiver module 1201 may be a transceiver circuit, a transceiver, a transceiver, or a communication interface.

The transceiver module 1201 is configured to receive a first service requirement parameter and a second service requirement parameter, where the first service requirement parameter is a service requirement parameter of a transmit end device, and the second service requirement parameter is a service requirement parameter of a receive end device. The processing module 1202 is configured to determine a first service transmission requirement between the transmit end device and the receive end device based on the first service requirement parameter and the second service requirement parameter.

In some embodiments, the first service requirement parameter includes one or more of the following parameters: a size of a data packet sent by the transmit end device; a time interval at which the transmit end device sends the data packet; a processing delay of a data packet to be sent by the transmit end device; and a quantity of lost data packets, a quantity of errors, or a data packet loss rate or error rate within a specified time period allowed by the transmit end device.

In some embodiments, the second service requirement parameter includes a transmission delay of the data packet sent by the transmit end device.

In some embodiments, the second service requirement parameter further includes a delay of processing, in the receive end device, the data packet received from the transmit end device.

In some embodiments, the transceiver module 1201 is specifically configured to: receive a first message, where the first message includes the first service requirement parameter; and receive a second message, where the second message includes the second service requirement parameter.

In some embodiments, the processing module 1202 is further configured to initiate establishment of a transmission path corresponding to the first service transmission requirement in the transport network, where the transmission path is a transmission path between the transmit end device and the receive end device. The transceiver module 1201 is further configured to send a third message, where the third message is used to indicate that the establishment of the transmission path is completed.

In some embodiments, that the processing module 1202 is further configured to initiate establishment of a transmission path corresponding to the first service transmission requirement in the transport network includes: The processing module 1202 is further configured to control the establishment of the transmission path corresponding to the first service transmission requirement in the transport network.

In some embodiments, that the processing module 1202 is further configured to initiate establishment of a transmission path corresponding to the first service transmission requirement in the transport network includes: The processing module 1202 is further configured to send the first service transmission requirement to a control network element in the transport network through the transceiver module 1201. The control network element controls the establishment of the transmission path corresponding to the first service transmission requirement. The transceiver module 1201 is further configured to receive a fourth message from the control network element, where the fourth message is used to indicate that the establishment of the transmission path is completed.

In some embodiments, the processing module 1202 is further configured to: when the transport network does not meet the first service transmission requirement, obtain a second service transmission requirement, where the second service transmission requirement is an updated service transmission requirement corresponding to the first service transmission requirement. The processing module 1202 is further configured to initiate establishment of a transmission path corresponding to the second service transmission requirement in the transport network, where the transmission path is a transmission path between the transmit end device and the receive end device. The transceiver module 1201 is further configured to send a fifth message, where the fifth message is used to indicate that the establishment of the transmission path is completed.

In some embodiments, that the processing module 1202 is configured to obtain a second service transmission requirement includes: The processing module 1202 is configured to: send a sixth message, where the sixth message carries an updated service requirement parameter of the transmit end device; receive a seventh message, where the seventh message is used to acknowledge that a change of a service requirement parameter of the transmit end device is allowed; and determine the second service transmission requirement based on the second service requirement parameter and the updated service requirement parameter of the transmit end device.

In some embodiments, that the processing module 1202 is configured to obtain a second service transmission requirement includes: The processing module 1202 is configured to: send an eighth message, where the eighth message carries an updated service requirement parameter of the receive end device; receive a ninth message, where the ninth message is used to acknowledge that a change of a service requirement parameter of the receive end device is allowed; and determine the second service transmission requirement based on the first service requirement parameter and the updated service requirement parameter of the receive end device.

In some embodiments, that the processing module 1202 is configured to obtain a second service transmission requirement includes: The processing module 1202 is configured to: send a sixth message, where the sixth message carries an updated service requirement parameter of the transmit end device; receive a seventh message, where the seventh message is used to acknowledge that a change of a service requirement parameter of the transmit end device is allowed; send an eighth message, where the eighth message carries an updated service requirement parameter of the receive end device; receive a ninth message, where the ninth message is used to acknowledge that a change of a service requirement parameter of the receive end device is allowed; and determine the second service transmission requirement based on the updated service requirement parameter of the transmit end device and the updated service requirement parameter of the receive end device.

All related content of the steps in the foregoing method embodiments may be cited in function descriptions of the corresponding functional modules. Details are not described herein again for brevity.

In this embodiment, the first device 120 is presented in a form of functional modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the first device 120 may be in a form of the communication device 800 shown in FIG. 8.

For example, the processor 801 in the communication device 800 shown in FIG. 8 may invoke the computer-executable instructions stored in the memory 803, to enable the communication device 800 to perform the method for determining a service transmission requirement in the foregoing method embodiment.

Specifically, functions/implementation processes of the transceiver module 1201 and the processing module 1202 in FIG. 12 may be implemented by the processor 801 in the communication device 800 shown in FIG. 8 by invoking the computer-executable instructions stored in the memory 803. Alternatively, a function/an implementation process of the processing module 1202 in FIG. 12 may be implemented by the processor 801 in the communication device 800 shown in FIG. 8 by invoking the computer-executable instructions stored in the memory 803. A function/an implementation process of the transceiver module 1201 in FIG. 12 may be implemented through the communication interface 804 in the communication device 800 shown in FIG. 8.

Because the first device 120 provided in this embodiment can perform the foregoing method for determining a service transmission requirement, for a technical effect that can be obtained by the first device 120, refer to the foregoing method embodiment. Details are not described herein again for brevity.

It should be noted that one or more of the foregoing modules or units may be implemented by using software, hardware, or a combination thereof. When any one of the foregoing modules or units is implemented by using software, the software exists in a form of computer program instructions that are stored in a memory. The processor may be configured to execute the program instructions to implement the foregoing method procedures. The processor may be built in an SoC (system-on-a-chip) or an ASIC, or may be an independent semiconductor chip. In addition to a core configured to perform an operation or processing by executing the software instructions, the processor may further include a necessary hardware accelerator, for example, a field programmable gate array (FPGA), a PLD (programmable logic device), or a logic circuit that implements a dedicated logical operation.

When the foregoing modules or units are implemented by using hardware, the hardware may be any one of or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete component, and the hardware may run necessary software or does not depend on software, to perform the foregoing method procedures.

In some embodiments, the application further provides a communication apparatus (for example, the communication apparatus may be a chip or a chip system). The communication apparatus includes a processor, configured to implement the method in any one of the foregoing method embodiments. In some embodiments, the communication apparatus further includes a memory. The memory is configured to store necessary program instructions and data. The processor may invoke program code stored in the memory, to indicate the communication apparatus to perform the method in any one of the foregoing method embodiments. Certainly, the memory may not be in the communication apparatus. When the communication apparatus is the chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to this application without departing from the spirit and scope of this application. Correspondingly, the specification and the accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the claims of this application and equivalent technologies thereof.

What is claimed is:

1. A method, wherein the method comprises:

receiving, by a communication apparatus, a first service requirement parameter and a second service requirement parameter, wherein the first service requirement parameter is a service requirement parameter of a transmit end device, and the second service requirement parameter is a service requirement parameter of a receive end device;

determining, by the communication apparatus, based on the first service requirement parameter and the second service requirement parameter, a first requirement between the transmit end device and a transport network, and a second requirement between the receive end device and the transport network; and initiating, by the communication apparatus, establishment of a first transmission path between the transmit end device and the transport network with the first requirement between the transmit end device and the transport network, and a second transmission path between the receive end device and the transport network with the second requirement between the receive end device and the transport network, wherein the initiating establishment of the first transmission path and the second transmission path comprises:

sending, by the communication apparatus, the first requirement between the transmit end device and the transport network, and the second requirement between the receive end device and the transport network to a policy control function network element, wherein the first requirement between the transmit end device and the transport network is for establishing the first transmission path, and the second requirement between the receive end device and the transport network is for establishing the second transmission path.

2. The method according to claim 1, wherein the first service requirement parameter comprises at least one of:

a size of a data packet from the transmit end device;

a time interval at which the transmit end device sends the data packet;

a processing delay of a data packet from the transmit end device; or a quantity of lost data packets, a quantity of errors, a data packet loss rate or a data packet error rate within a specified time period allowed by the transmit end device.

3. The method according to claim 1, wherein the second service requirement parameter comprises a transmission delay of a data packet from the transmit end device.

4. The method according to claim 3, wherein the second service requirement parameter further comprises a delay of processing, in the receive end device, the data packet received from the transmit end device.

5. A communication apparatus, comprising:

a non-transitory memory configured to store non-transitory instructions;

a processor coupled with the non-transitory memory, and configured to execute the non-transitory instructions that cause the communication apparatus to:

receive a first service requirement parameter and a second service requirement parameter, wherein the first service requirement parameter is a service requirement parameter of a transmit end device, and the second service requirement parameter is a service requirement parameter of a receive end device;

determine, based on the first service requirement parameter and the second service requirement parameter, a first requirement between the transmit end device and a transport network, and a second requirement between the receive end device and the transport network; and initiate establishment of a first transmission path between the transmit end device and the transport network with the first requirement between the transmit end device and the transport network, and a second transmission path between the receive end device and the transport network with the second requirement between the receive end device and the transport network, wherein the processor configured to execute the non-transitory instructions that further cause the communication apparatus to initiate establishment of the first transmission path and the second transmission path, comprises the processor being configured to execute the non-transitory instructions that further cause the communication apparatus to:

send the first requirement between the transmit end device and the transport network, and the second requirement between the receive end device and the transport network to a policy control function network element, wherein the first requirement between the transmit end device and the transport network is for establishing the first transmission path, and the second requirement between the receive end device and the transport network is for establishing the second transmission path.

6. The communication apparatus according to claim 5, wherein the first service requirement parameter comprises at least one of:

a size of a data packet from the transmit end device;

a time interval at which the transmit end device sends the data packet;

a processing delay of a data packet from the transmit end device; or a quantity of lost data packets, a quantity of errors, a data packet loss rate or a data packet error rate within a specified time period allowed by the transmit end device.

7. The communication apparatus according to claim 5, wherein the second service requirement parameter comprises a transmission delay of a data packet from the transmit end device.

8. The communication apparatus according to claim 7, wherein the second service requirement parameter further comprises a delay of processing, in the receive end device, the data packet received from the transmit end device.

9. A non-transitory storage medium comprising non-transitory instructions which, in response to be executed by a computer, cause the computer to:

receive a first service requirement parameter and a second service requirement parameter, wherein the first service requirement parameter is a service requirement parameter of a transmit end device, and the second service requirement parameter is a service requirement parameter of a receive end device;

determine, based on the first service requirement parameter and the second service requirement parameter, a first requirement between the transmit end device and a transport network, and a second requirement between the receive end device and the transport network; and initiate establishment of a first transmission path between the transmit end device and the transport network with the first requirement between the transmit end device and the transport network, and a second transmission path between the receive end device and the transport network with the second requirement between the receive end device and the transport network, wherein the initiate establishment of the first transmission path and the second transmission path comprises further causing the computer to:

send the first requirement between the transmit end device and the transport network, and the second requirement between the receive end device and the transport network to a policy control function network element, wherein the first requirement between the transmit end device and the transport network is for establishing the first transmission path, and the second requirement between the receive end device and the transport network is for establishing the second transmission path.

10. The non-transitory storage medium according to claim 9, wherein the first service requirement parameter comprises at least one of:

a size of a data packet from the transmit end device;

a time interval at which the transmit end device sends the data packet;

a processing delay of a data packet to the transmit end device; or a quantity of lost data packets, a quantity of errors, a data packet loss rate or a data packet error rate within a specified time period allowed by the transmit end device.

11. The method according to claim 1, wherein the determining, based on the first service requirement parameter and the second service requirement parameter, the first requirement between the transmit end device and the transport network and the second requirement between the receive end device and the transport network comprises:

determining a first service transmission requirement between the transmit end device and the receive end device based on the first service requirement parameter and the second service requirement parameter; and decomposing the first service transmission requirement into the first requirement between the transmit end device and the transport network, and the second requirement between the receive end device and the transport network.

12. The method according to claim 1, further comprising:

receiving a first message indicating that the establishment is completed.

13. The method according to claim 12, wherein after receiving the first message, the method further comprises:

sending, to the transmit end device, a second message indicating that establishment of a transmission path between the transmit end device and the receive end device is completed; and sending, to the receive end device, a third message indicating that establishment of the transmission path between the transmit end device and the receive end device is completed.

14. The communication apparatus according to claim 5, wherein the processor configured to execute the non-transitory instructions that cause the communication apparatus to determine, based on the first service requirement parameter and the second service requirement parameter, the first requirement between the transmit end device and the transport network and the second requirement between the receive end device and the transport network comprises the processor being configured to execute the non-transitory instructions that further cause the communication apparatus to:

determine a first service transmission requirement between the transmit end device and the receive end device based on the first service requirement parameter and the second service requirement parameter; and decompose the first service transmission requirement into the first requirement between the transmit end device and the transport network, and the second requirement between the receive end device and the transport network.

15. The communication apparatus according to claim 5, wherein the processor is configured to execute the non-transitory instructions that further cause the communication apparatus to:

receive a first message indicating that the establishment is completed.

16. The communication apparatus according to claim 15, wherein after the first message is received, the processor is further configured to execute the non-transitory instructions that further cause the communication apparatus to:

send, to the transmit end device, a second message indicating that establishment of a transmission path between the transmit end device and the receive end device is completed; and send, to the receive end device, a third message indicating that establishment of the transmission path between the transmit end device and the receive end device is completed.

17. The non-transitory storage medium according to claim 9, wherein the computer configured to execute the non-transitory instructions that cause the computer to determine, based on the first service requirement parameter and the second service requirement parameter, the first requirement between the transmit end device and the transport network and the second requirement between the receive end device and the transport network comprises the computer being configured to execute the non-transitory instructions that further cause the computer to:

determine a first service transmission requirement between the transmit end device and the receive end device based on the first service requirement parameter and the second service requirement parameter; and decompose the first service transmission requirement into the first requirement between the transmit end device and the transport network, and the second requirement between the receive end device and the transport network.

18. The non-transitory storage medium according to claim 9, wherein the computer is configured to execute the non-transitory instructions that further cause the computer to:

receive a first message indicating that the establishment is completed.

19. The non-transitory storage medium according to claim 18, wherein after the first message is received, the computer is further configured to execute the non-transitory instructions that further cause the computer to:

send, to the transmit end device, a second message indicating that establishment of a transmission path between the transmit end device and the receive end device is completed; and send, to the receive end device, a third message indicating that establishment of the transmission path between the transmit end device and the receive end device is completed.

* * * * *